US012067359B2

(12) United States Patent
Shin

(10) Patent No.: US 12,067,359 B2
(45) Date of Patent: Aug. 20, 2024

(54) PROVIDING FINE-GRAINED VERSION HISTORIES OF ELECTRONIC DOCUMENTS AT A PLATFORM

(71) Applicant: Google LLC, Mountain View, CA (US)

(72) Inventor: Dongeek Shin, San Jose, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/719,917

(22) Filed: Apr. 13, 2022

(65) Prior Publication Data

US 2023/0334240 A1 Oct. 19, 2023

(51) Int. Cl.
*G06F 40/197* (2020.01)
*G06F 3/048* (2013.01)
*G06F 3/0484* (2022.01)
*G06F 40/166* (2020.01)

(52) U.S. Cl.
CPC .......... *G06F 40/197* (2020.01); *G06F 3/048* (2013.01); *G06F 3/0484* (2013.01); *G06F 40/166* (2020.01); *G06F 2203/04803* (2013.01)

(58) Field of Classification Search
CPC ...... G06F 40/197; G06F 40/166; G06F 3/048; G06F 3/0484
See application file for complete search history.

(56) References Cited

U.S. PATENT DOCUMENTS

| | | | | |
|---|---|---|---|---|
| 10,346,532 B2 * | 7/2019 | Codrington | | G06F 16/93 |
| 2012/0271867 A1 * | 10/2012 | Grossman | | G06F 16/93 |
| | | | | 707/821 |
| 2014/0032502 A1 * | 1/2014 | Kraley | | G06F 40/197 |
| | | | | 707/663 |
| 2016/0378734 A1 * | 12/2016 | Mullins | | G06F 3/04855 |
| | | | | 715/229 |
| 2017/0185573 A1 * | 6/2017 | Milvaney | | H04L 67/1097 |
| 2020/0117705 A1 * | 4/2020 | Hance | | G06F 16/152 |

OTHER PUBLICATIONS

PCT International Search Report and Written Opinion for International Application No. PCT/US2023/016323 mailed Jun. 15, 2023, 20 pages.

* cited by examiner

*Primary Examiner* — Tan H Tran

(74) *Attorney, Agent, or Firm* — Lowenstein Sandler LLP

(57) ABSTRACT

A first version of an electronic document is provided via a first region of a graphical user interface (GUI) for presentation to a first user of a collaborative document platform. A second region of the GUI includes an edit history GUI element that enables one or more users to access each edit made to the electronic document. A user selection of a portion of the edit history GUI element is detected. The user-selected portion of the edit history GUI element corresponds to edits made to the electronic document by a second user. A determination is made of a state of the electronic document following the edits made by the second user. The first region of the GUI is updated to include a rendering of a second version of the electronic document. The second version is rendered in view of the determined document state.

20 Claims, 14 Drawing Sheets

| TIME 326 | EDIT 328 | COORDINATE 330 |
|---|---|---|
| T0 | H | (0,0) |
| T1 | E | (0,1) |
| T2 | O | (0,2) |
| T3 | -O | (0,2) |
| T4 | L | (0,2) |
| T5 | L | (0,3) |
| T6 | O | (0,4) |
| T20 | \space | (1,0) |
| T21 | H | (1,0) |
| T22 | I | (1,1) |
| T23 | style=bold | (1,0) – (1,1) |

PROVIDING FINE-GRAINED VERSION HISTORIES OF ELECTRONIC DOCUMENTS AT A PLATFORM

TECHNICAL FIELD

Aspects and implementations of the present disclosure relate to providing fine-grained version histories of electronic documents at a platform.

BACKGROUND

A platform (e.g., a collaborative document platform, etc.) can enable users to access electronic documents via a graphical user interface (GUI) associated with the platform. In some instances, one or more users can add, modify, and/or remove content of an electronic document. Content of an electronic document can include text objects (e.g., including alphanumeric characters and/or symbolic characters), image objects (e.g., static images, animated images, videos, etc.) and/or drawing objects (e.g., shapes, annotations, highlights, etc.).

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for providing fine-grained version histories of electronic documents at a platform. In an implementation, a method includes providing, for presentation to a first user of one or more users of a collaborative document platform, a first version of an electronic document via a first region of a graphical user interface (GUI) of the collaborative document platform. A second region of the GUI includes an edit history GUI element that enables a respective user of the one or more users to access each edit made to the electronic document by the one or more users. The method further includes detecting a user selection of a portion of the edit history GUI element. The user-selected portion of the edit history GUI element corresponds to one or more edits made to the electronic document by a second user of the one or more users. The method further includes determining, based on metadata for the electronic document, a state of the electronic document following the one or more edits made to the electronic document by the second user. The method further includes updating the first region of the GUI to include a rendering of a second version of the electronic document, wherein the second version of the electronic document is rendered in view of the determined state of the electronic document.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
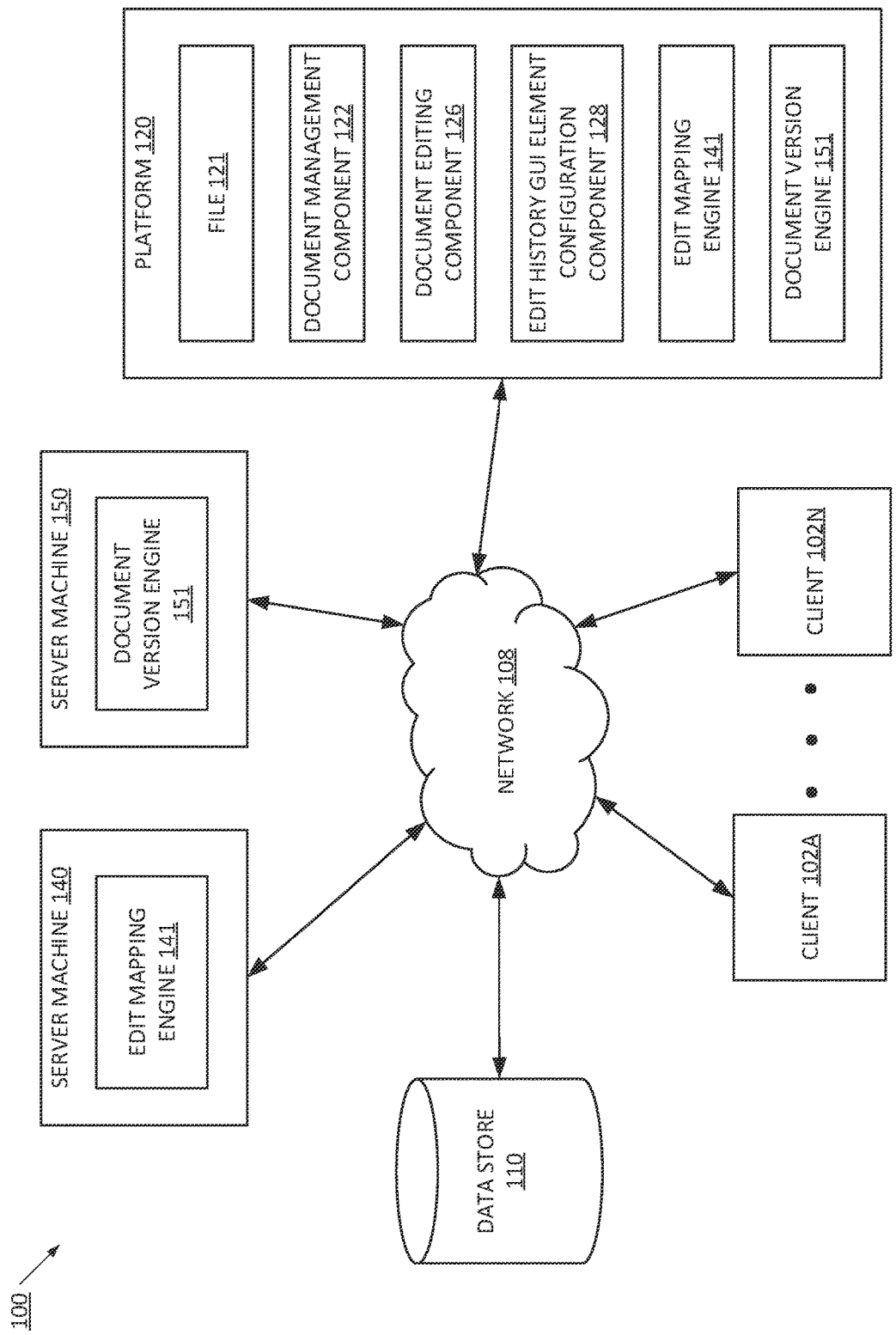
FIG. 1 illustrates an example system architecture, in accordance with implementations of the present disclosure.

Aspects of the present disclosure relate to providing fine-grained version histories for electronic documents at a platform. A platform, such as a collaborative document platform, can provide a user with access to an electronic document via a graphical user interface (GUI) associated with the platform. The platform GUI can enable the user to consume the document, edit the document, annotate the document, and so forth. For example, the platform GUI can enable the user to edit the document by adding, modifying, and/or removing content (e.g., text content, image content, drawing content, etc.) of the document. The platform can update the electronic document based on edits made by the user. Other users of the platform can access and/or further edit the updated document via the platform GUI.

Collaborative document platforms can enable a user to access edits made to an electronic document by the user or by other users of the platform. For example, before and/or while a user is editing an electronic document, the user can enable a "track changes" feature (e.g., by engaging with one or more GUI elements of the platform GUI). When the "track changes" feature is enabled, the platform annotates the electronic document as the user is providing edits to emphasize the edits provided by the user, the section(s) of the electronic document that includes the edits, and in some instances, a date and/or time at which the edits were provided. Although the "track changes" feature can indicate (e.g., to the user, to other users of the platform) which edits to the electronic document were provided by the user, such feature can only be implemented if the user providing the edits actively enables the feature. Some users may forget or choose not to enable the feature while editing the electronic document, and therefore the provided edits may not be easily identified by the user making the edits or other users accessing the electronic document. In addition, even when the "track changes" feature is enabled, the platform only provides annotations for the final edits made by the user and does not provide any indication of iterations of edits that were provided by the user before the final edits.

Some collaborative document platforms can, additionally or alternatively, provide users with access to one or more versions of the electronic document that are generated based on provided edits. For example, a user may provide edits to an electronic document, as described above. In response to determining that the user has provided a number of edits and/or has edited the electronic document for an amount of time that satisfies a version generation criterion (e.g., meets or exceeds a threshold number of edits, meets or exceeds a threshold amount of time, etc.), the platform can generate a historical version of the electronic document. The historical version of the electronic document can indicate a state of the electronic document up until the time period at which the historical version was generated. Once the platform detects that the user (or another user of the platform) has provided another number of edits and/or has edited the electronic document for another amount of time that satisfies the version generation criterion, the platform can generate another historical version of the electronic document. The platform can provide users with access to each historical version of the electronic document (e.g., via the platform GUI). However, as indicated above, each historical version generated for the electronic document may only include a state of the document at the time such version was generated (referred to as a course-grained version history herein) and does not indicate iterations of edits made to the electronic document before the historical version is generated. In an illustrative example, a user may add, to an electronic document, one or more text strings that are particularly relevant or interesting to a topic associated with the document. Before a historical version of the document is generated, the user may decide to remove the one or more text strings (e.g., if the user changes their mind regarding the addition of the text string(s), etc.). Accordingly, the historical version generated for the document may not include an indication of the text string(s). At a later time, an additional user accessing the document may want to provide one or more text strings that cover the same or similar content that was previously included in the now removed text string(s). However, as the historical version of the electronic document does not include an indication of the text string(s) that were provided by the user before the historical version was generated, the additional user does not know of the previously provided text string(s) and therefore has to provide new text string(s) to the electronic document.

In accordance with the above, platforms that implement course-grained version history techniques are not able to provide users with a detailed view of each edit that was provided to an electronic document. Accordingly, users may spend more time editing a document and are not able to access edits previously made to the document. As users spend more time editing an electronic document, a larger number of resources of computing systems for the platform are consumed (e.g., by the platform, by a client device accessing the electronic document, etc.), and such resources are not available for other processes. Accordingly, an overall latency for the computing system is increased and an overall efficiency for the computing system is decreased. In addition, some electronic documents can be extremely large (e.g., can include hundreds or thousands of pages, etc.). Even though users may only edit one or more sections of the electronic document, conventional platforms can generate historical versions of the entire electronic document, as described above. Files including each historical version generated by the conventional platforms can therefore be extremely large and can consume a significant amount of memory resources. Accordingly, a smaller amount of memory resources is available for other types of files, which can impact an overall performance of the computing system.

Aspects of the present disclosure address the above and other deficiencies by providing techniques for fine-grained version histories of electronic documents at a platform. As a user provides edits to an electronic document, a platform (e.g., a collaborative document platform) can obtain information associated with each edit. In some embodiments, the obtained information can include an indication of a type of a respective edit made to the document (e.g., an addition, a removal, and/or a modification of a text object, a drawing object, an image object, etc.), coordinates associated with a section of the document that includes the respective edit, a timestamp associated with a time at which the respective edit was provided, and, in some embodiments, an identifier associated with the user that provided the respective edit. The platform can generate a mapping between the edit type, the coordinates, the timestamp and/or the user identifier and can store the generated mapping at a memory associated with the platform. In some embodiments, the platform can maintain an edit data structure that stores mappings associated with each edit made to the electronic document. The platform can update the edit data structure to include the generated mapping, in some embodiments.

After the edits are provided, the user and/or additional user of the platform can access a current version of the electronic document via a graphical user interface (GUI) provided by the platform. A current version of the document corresponds to a state of the electronic document at or around a time period at which the document is accessed by the user and/or the additional user. In some embodiments, the platform can provide the current version via a first region of the platform GUI. A second region of the platform GUI can include an edit history GUI element that enables a respective user of the platform to access each edit to the electronic document. In some embodiments, the edit history GUI element can be configured to include one or more portions, where each portion of the GUI element corresponds to a time period between and/or including an initial time period associated with the electronic document (e.g., a time period in which edits were initially provided to the document, a time period when the document was created, etc.) and a current time period associated with the electronic document (e.g., a time period in which the document is being accessed). The platform can determine sets of pixels of the platform GUI that includes a rendering of each respective portion of the edit history GUI element and can generate a mapping between the determined set of pixels and a time period corresponding to each respective portion (referred to as a pixel-to-time period mapping herein). Examples of the edit history GUI element are provided with respect to FIGS. 4A-5C.

In some embodiments, the user and/or the additional user can select a particular portion of the edit history GUI element (e.g., by engaging with a selection component of the edit history GUI element, etc.). In response to detecting the user selection, the platform can determine a set of pixels of the GUI that correspond to the user selection and can identify a time period associated with the set of pixels using the pixel-to-time period mapping. The platform can identify an entry of the edit data structure that includes a timestamp corresponding to the identified time period. Responsive to identifying the entry of the edit data structure, the platform can determine a state of the document at the time period associated with the corresponding timestamp. The determined state of the document can include each edit made to the document up until the one or more edits associated with the identified entry. The platform can update the first region of the GUI to include a rendering of a prior version of the electronic document. The prior version can be rendered in view of the determined state of the electronic document. In some embodiments, the user can select another portion of the edit history GUI element, as described above. The platform can determine another state of the document at or around the time period corresponding to the additional portion, as described above, and can update the first region of the GUI to include a rendering of another prior version of the document corresponding to the additional state. In an illustrative example, the user and/or the additional user can move a selection component of the edit history GUI element between various time periods between the initial time period and the current time period. As the user and/or the additional user moves the selection component, the platform can update the first region of the GUI to include a rendering of the document including each iteration of edits made between the various time periods, in accordance with embodiments described herein.

Aspects of the present disclosure cover techniques to provide users of a platform with access to each iteration of edits made to an electronic document (referred to herein as fine-grained document version histories). The platform can track each edit made to an electronic document by each user of the platform and can store a mapping for each tracked edit at a data structure maintained by the platform. When the user, or another user, selects a portion of the edit history GUI element, the platform can determine a state of the document at or around a time period associated with the user-selected portion and can provide a rendering of a prior version of the document corresponding to the determined state. As each edit made to the electronic document is tracked by the platform and available for access using the edit history GUI element, a user of the platform can access each iteration of edits made to the document. Accordingly, the user may spend less time editing the document, for example, as the user can consider prior edits made to the document that may not be incorporated into a final version of the document. As the user spends less time editing the document, a fewer amount of resources of computing systems for the platform are consumed (e.g., by the platform, by a client device associated with the user), and more resources can be made available to other processes. As more resources are made available, an overall computing system latency is decreased and an overall computing system efficiency is increased. In addition, according to aspects of the present disclosure, the platform can store mappings associated with each edit made to the electronic document, which can be much smaller than files including full prior versions of the electronic document. Accordingly, a smaller amount of memory resources of the computing systems is consumed and more memory resources are available for other types of files or data, thus improving an overall performance of the computing system.

FIG. 1 illustrates an example system architecture 100, in accordance with implementations of the present disclosure. The system architecture 100 (also referred to as "system" herein) includes client devices 102A-N, a data store 110, a platform 120, and/or a server machine 150 each connected to a network 108. In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. In some embodiments, a data item can correspond to one or more portions of a document displayed via a graphical user interface (GUI) on a client device 102, in accordance with embodiments described herein. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 108.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Each client device can include a content viewer. In some embodiments, a content viewer can be an application that provides a graphical user interface (GUI) for users to view, create, or edit content of a file 121, such as an electronic document file, an electronic message file (e.g., an email file), an image file, a video file, etc. For example, the content viewer can be a web browser that can access, retrieve, present, and/or navigate files 121 served by a web server. The content viewer can render, display, and/or present the content of a file 121 to a user. In one example, the content viewer can be a standalone application (e.g., a mobile application or app) that allows users to view, edit, and/or create digital content items (e.g., electronic documents, electronic messages, digital video items, digital images, electronic books, etc.). In some implementations, the content viewer can be an electronic document platform application for users to generate, edit, and/or upload content for electronic documents on the platform 120. In other or similar implementations, the content viewer can be an electronic messaging platform application (e.g., an electronic mail (e-mail) application) for users to generate and send messages via platform 120. As such, the content viewers can be provided to the client devices 102A-102N by platform 120.

In some implementations, platform 120 and/or server machine 150 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to a file 121 (e.g., an electronic document, an e-mail message, etc.) and/or provide the file 121 to the user. For example, platform 120 can be an electronic document platform, such as a collaborative document platform. The electronic document platform may allow a user to create, edit (e.g., collaboratively with other users), access or share with other users an electronic document stored at data store 110. In another example, platform 120 can be an electronic messaging platform (e.g., e-mail platform). The electronic messaging platform can allow a user to create, edit, or access electronic messages (e.g., e-mails) addressed to other users of the electronic messaging platform or users of client devices outside of the electronic messaging platform. Platform 120 can also include a website (e.g., a webpage) or application back-end software that can be used to provide a user with access to files 121.

As illustrated in FIG. 1, platform 120 can include a document management component 122, in some embodiments. Document management component 122 can be configured to manage access to a particular document by a user of platform 120. For example, a client device 102 can provide a request to platform 120 for a particular file 121 corresponding to an electronic document. Document management component 122 can identify the file 121 (e.g., stored in data store 110) and can determine whether a user associated with the client device 102 is authorized to access the requested file 121. Responsive to determining that the user is authorized to access the requested file 121, document management component 122 can provide access to the file 121 to the client device 102. The client device 102 can provide the user with access to the file via the GUI of the content viewer, as described above.

As indicated above, a user can create and/or edit an electronic document (e.g., of file 121) via a GUI of a content viewer of a client device associated with the user (also referred to herein as a platform GUI). In some embodiments, the electronic document can be or can correspond to a word document, slide presentation document, a spreadsheet document, and so forth. Platform 120 can include a document editing component 124, which is configured to enable a user to create and/or edit an electronic document. For example, a client device 102 associated with a user of platform 120 can transmit a request to platform 120 to create a word document based on a word document template associated with platform 120. Platform 120 can generate a file 121 associated with the word document based on the word document template and can provide the user with access to the word document via the platform GUI. In another example, a client device 102 associated with a user of platform 120 can transmit a request to access an electronic document (e.g., a word document) via the platform GUI. Document management component 122 can obtain the file 121 associated with the requested electronic document, as described above, and document editing component 124 can provide the user with access to the electronic document via the platform GUI. The user can edit one or more portions of the electronic document via the platform GUI and the document editing component 124 can update the file 121 associated with the electronic document to include the edits to the one or more portions.

An electronic document can be a collaborative document that, in some embodiments, can be edited (e.g., concurrently) by one or more users of platform 120. In some embodiments, an electronic document can include multiple different types of content objects (simply referred to as objects herein). For example, an electronic document can include text objects (e.g., text strings including one or more alphanumeric characters and/or symbolic characters), image objects (e.g., static images, animated images, videos), drawing objects (e.g., annotations, sketches, etc.), and so forth. Document editing component 124 can enable the user to provide and/or modify objects of the electronic document, in accordance with embodiments described above. For example, the document editing component 124 can enable the user to add or remove one or more objects from the electronic document, move one or more objects from a section of the electronic document to another section of the electronic document, modify a format and/or a style associated with one or more objects, and so forth. It should be noted that an edit, as described herein, can correspond to an addition, a removal, and/or a modification of a smallest unit associated with a content object. For example, an edit can correspond to an addition, a removal, and/or a modification to a single character (e.g., an alphanumeric character, a symbolic character, etc.) of a string of text, one or more pixels associated with an image object, and/or one or more lines or shapes associated with a drawing object. As mentioned above, in some embodiments, one or more users can provide edits to the electronic document. Each user can edit the electronic document concurrently and, in some embodiments, users can see edits by other users in real time (e.g., within milliseconds).

As illustrated in FIG. 1, platform 120 can include an edit mapping engine 141 that is configured to detect edits made to an electronic document by one or more users and generate mapping associated with the detected edits. In an illustrative example, edit mapping engine 141 (and/or document editing component 124) can detect that a user has made one or more edits to an object of an electronic document (e.g., via the platform GUI). Edit mapping engine 141 can determine a type associated with the one or more edits (e.g., an addition, a removal, a modification etc. to an alphanumeric character, a symbolic character, an image object, a drawing object, etc.) and a section of the electronic document that was affected or otherwise impacted by the one or more edits. Edit mapping engine 141 can also generate a timestamp corresponding to a time at which the one or more edits were made by the user. Edit mapping engine 141 can generate a mapping between the type associated with the one or more edits, coordinates associated with the section that was affected or otherwise impacted by the one or more edits, and the generated time stamp. In some embodiments, edit mapping engine 141 can further generate the mapping based on an identifier associated with the user that made the one or more edits. Edit mapping engine 141 can update metadata for the electronic document to include the generated mapping, in some embodiments. For example, edit mapping engine 141 can add the generated mapping to an edit data structure associated with the electronic document. The edit data structure can be stored at data store 110, in some embodiments. Further details regarding the edit data structure and edit mapping engine 141 are provided herein.

In some embodiments, the user (or another user) of platform 120 can access the edited electronic document (e.g., via the platform GUI). The platform GUI can include, in some embodiments, a first region that provides the current version of the edited electronic document. The platform GUI can additionally include an edit history GUI element that enables the user to access each edit made to the electronic document by one or more users. The edit history GUI element can include one or more portions corresponding to time periods of a timeline associated with the document. The associated timeline can begin with a time period at which the electronic document was first created and/or initially edited (referred to herein as an initial time period) and can end with a time period after which the electronic document was most recently edited and/or accessed by the user of platform 120 (referred to herein as a current time period). One or more time periods of the timeline can correspond with timestamps generated for edits made to the electronic document (e.g., between when the electronic document was first created and when the electronic document is accessed by the user). In some embodiments, the edit history GUI element can be configured by edit history GUI element configuration component 128 (e.g., in response to a user accessing a document that includes one or more edits, etc.), in accordance with embodiments described below.

A document version engine 151 can detect that the user has selected a portion of the edit history GUI element, in some embodiments, and can identify a set of pixels that correspond to the user-selected portion. The document version component 126 can determine whether the identified set of pixels corresponds to one or more of a set of timestamps associated with edits made to the electronic document using a pixel-to-time period mapping. Responsive to determining that the identified set of pixels corresponds to a respective timestamp, document version engine 151 can identify edits made to the electronic document up to the point of time associated with the respective timestamp using the edit data structure. Document version engine 151 can update the platform GUI to include a rendering of a version of the electronic document that includes a state of the electronic document following the identified edits, in some embodiments. Further details regarding the rendering of the version of the electronic document are included herein.

It should be noted that although FIG. 1 illustrates edit mapping engine 141 and document version engine 151 as part of platform 120, in additional or alternative embodiments, edit mapping engine 141 and/or document version engine 151 can reside on one or more server machines that are remote from platform 120 (e.g., server machine 150). In some embodiments, document editing component 124 can transmit data associated with one or more edits to edit mapping engine 141 (e.g., via network 108, via a bus, etc.) residing on server machine 140. Edit mapping engine 141 can generate the mapping and update the edit data structure to include the generated mapping, as described above. In response to a detection (e.g., by document management component 122, document editing component 124, and/or another component of platform 120) of a user selection of a portion of the edit history GUI element, document version engine 151 can identify edits associated with a timestamp associated with the user-selected portion of the edit history GUI element and can obtain a rendering of a version of the electronic document including the identified edits, as described above. Document version engine 151 can provide the rendering to platform 120 (e.g., via network 108, via a bus, etc.) and platform 120 can provide the rendering via the platform GUI, as described herein.

It should be noted that in some other implementations, the functions of server machines 140 and 150 and/or platform 120 can be provided by a fewer number of machines. For example, in some implementations server machines 140 and 150 may be integrated into a single machine, while in other implementations server machines 140 and 150 may be integrated into multiple machines. In addition, in some implementations one or more of server machines 140 and 150 may be integrated into platform 120.

In general, functions described in implementations as being performed by platform 120 and/or server machines 140 and 150 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of platform 120 and users of platform 120 accessing an electronic document, implementations can also be generally applied to any type of documents or files. Implementations of the disclosure are not limited to electronic document platforms that provide document creation, editing, and/or viewing tools to users. Further, implementations of the disclosure are not limited to text objects or drawing objects and can be applied to other types of objects.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2A:
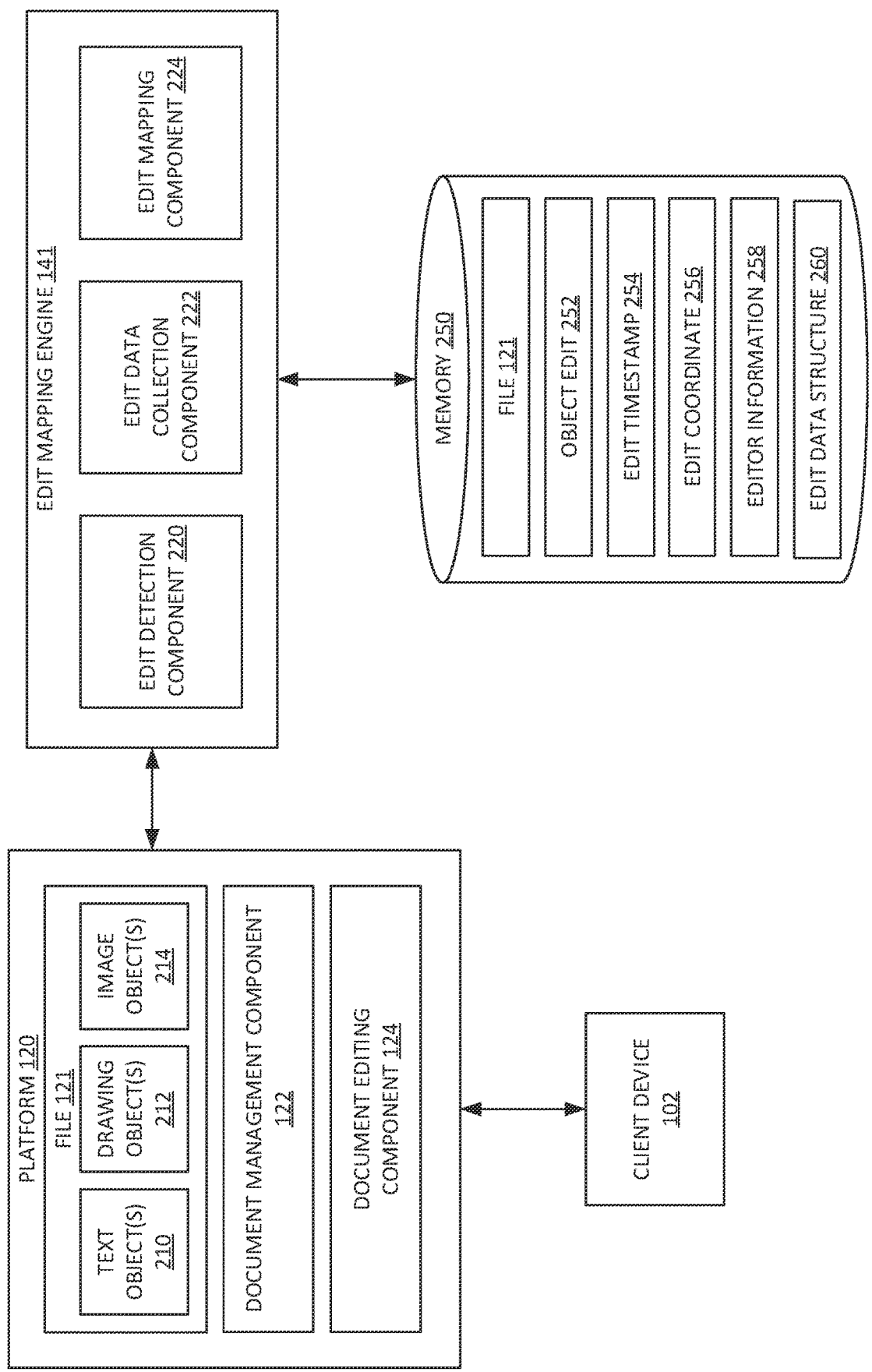
FIG. 2A is a block diagram illustrating an example platform and an edit mapping engine, in accordance with implementations of the present disclosure.

FIG. 2A is a block diagram illustrating an example platform 120 and an edit mapping engine 141, in accordance with implementations of the present disclosure. In some embodiments, platform 120 can include a file 121, a document management component 122, and/or a document editing component 124, as described with respect to FIG. 1. Platform 120 can be connected (e.g., via network 108) to one or more client devices 102 (e.g., client devices 102A-102N, etc.). File 121 can be a file for an electronic document, such as a word document, a slide presentation document, a spreadsheet document, etc. In some embodiments, the electronic document can include text object(s) 210, drawing object(s) 212, and/or image object(s) 214 that are provide and/or edited by a user associated with client device 102 via a platform GUI, as described with respect to FIG. 1. In some embodiments, the electronic document can additionally or alternatively include other types of objects. Edit mapping engine 141 can include an edit detection component 220, an edit data collection component 222, and/or an edit mapping component 224, as illustrated in FIG. 2A. In some embodiments, edit mapping engine 141 and/or platform 120 can be connected to memory 250 (e.g., via a network such as network 108, via a bus, etc.). In some embodiments, one or more portions of memory 250 can correspond to data store 110. One or more portions of memory 250 can additionally or alternatively correspond to a memory of client device 102 and/or another memory associated with system 100, in some embodiments.

As described above, document management component 122 can provide a user with access to an electronic document via a content viewer GUI provided by platform 120 (referred to as platform GUI herein). Document editing component 124 can provide the user with tools to create, modify, and/or remove content objects (e.g., text object(s) 210, drawing object(s) 212, image object(s) 214, etc.) from the electronic document. In some embodiments, the user can edit an object via one or more peripheral devices (e.g., a keyboard, a touch screen, a mouse, etc.) that is included with or otherwise connected to client device 102. For example, the user can edit text object(s) 210 by engaging with keys of a keyboard and/or buttons of a touch screen of client device 102. In response to detecting that the user has engaged with one or more keys of the keyboard and/or buttons of the touch screen, document editing component 124 can update one or more sections of the electronic document to correspond with the user-provided edit. In other or similar embodiments, the user can edit an object via one or more GUI elements of the platform GUI. For example, the platform GUI can include one or more GUI elements that enable the user to modify a formatting or style associated with one or more text object(s) 210. The user can engage with (e.g., select, click, etc.) the one or more GUI elements to select a particular format or style to be associated with the one or more object(s) 210. Responsive to detecting the user selection, document editing component 124 can update one or more sections of the electronic document in accordance with the selected format or style.

Figures 3A, 3B, 3C:
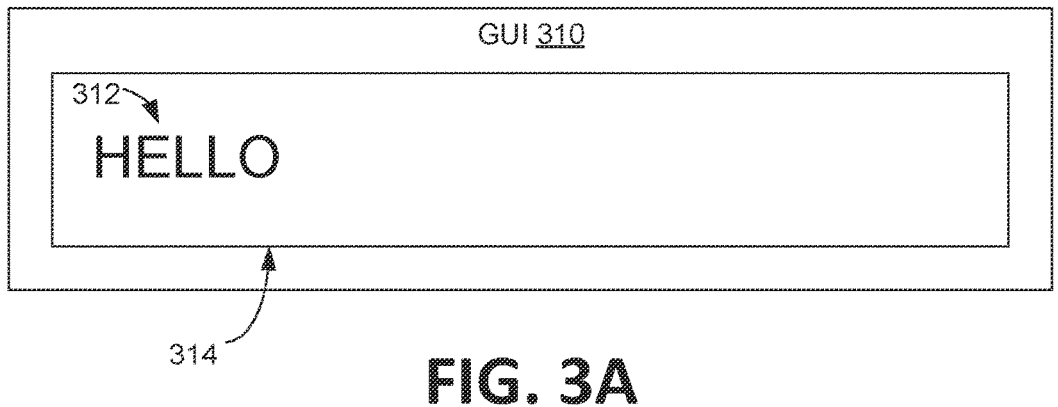
FIGS. 3A-3E illustrate edits made to an electronic document by a user of a platform and maintaining mappings of the edits, in accordance with implementations of the present disclosure.

FIGS. 3A-3E illustrate edits made to an electronic document by a user of platform 120 and maintaining mappings of the edits, in accordance with embodiments of the present disclosure. As illustrated in FIG. 3A, a user can provide text objects 312 to be included in section 314 of an electronic document that is accessible by the user via platform GUI 310, as described above. In an illustrative example, the text objects 312 can correspond to the text string "HELLO," as illustrated in FIG. 3A. The addition of each character of the text string "HELLO" can correspond to a respective edit by the user, in some embodiments. FIGS. 3B and 3C illustrate edits that were made to section 314 by the user to arrive at the text string "HELLO," as described in further detail below.

Referring back to FIG. 2, edit detection component 220 can detect that a user has made an edit to the electronic document, in some embodiments. For example, edit detection component 220 can detect that document editing component 124 has updated the electronic document in response to a user selection or interaction with a peripheral device and/or a GUI element of the platform GUI, as described above. In another example, document editing component 124 can transmit a notification to edit detection component 220 (e.g., via network 108, via a bus, etc.) indicating the edit that was made to the electronic document by the user.

In response to edit detection component 220 detecting that the user has made an edit to the electronic document, edit data collection component 222 can collect data associated with the detected edit. In some embodiments, edit data collection component 222 can determine a type of edit that was made to a section of the document. An edit type can include an indication of what type of object was edited (e.g., a text object 210, a drawing object 212, an image object 214, etc.) and an indication of how the object was edited. For example, as illustrated in FIG. 3B, the user can edit section 314 of the electronic document by providing (e.g., via a keyboard, via a touchpad, etc.) the letters 322 "H," "E," and "O." Each addition of a letter 322 to section 314 can correspond to a respective edit to section 314. In accordance with the illustrative example of FIG. 3B, edit data collection component 222 can determine that a type of a first edit made to section 314 is an addition of the alphanumeric character "H," a type of a second edit made to section 314 is an addition of the alphanumeric character "E", and a type of a third edit made to is an addition of the alphanumeric character "O." In some embodiments, edit data collection component 222 can store an indication of the determined type of edit as object edit 252 in memory 250. In additional or alternative embodiments, the determined type for each edit can be added to an edit mapping stored at edit data structure 260, in accordance with embodiments described below.

In some embodiments, edit data collection component 222 can generate timestamps for each edit made to the electronic document. A timestamp can indicate a time period at which a respective edit was provided by a user for the electronic document and/or a time period at which the respective edit was detected by edit data collection component 222. In some embodiments, one or more timestamps generated by edit data collection component 222 can be a Unix timestamp. A Unix timestamp refers to a timestamp describing a number of seconds that have elapsed since the Unix epoch (e.g., 00:00:00 UTC on 1 Jan. 1970). Timestamps corresponding to other systems for tracking time can also be used in addition to or in place of a Unix timestamp. In other or similar embodiments, one or more timestamps generated by edit data collection component 222 can refer to a unit of time (e.g., seconds, microseconds, etc.) that an edit is made and/or detected from a time system 100 is initialized, file 121 is created, and so forth.

In accordance with the example illustrated in FIG. 3B, edit data collection component 222 can generate respective timestamps for each of the first, second, and third edits made to section 314 of the electronic document. For example, edit data collection component 222 can generate a first timestamp of time T0, indicating a time at which the first edit was made to section 314, a second timestamp of time T1, indicating a time at which the second edit was made to section 314, and a third timestamp of time T2, indicating a time at which the third edit was made to section 314. In some embodiments, edit data collection component 222 can store an indication of the first, second, and/or third timestamps as edit timestamp(s) 254 in memory 250. In additional or alternative embodiments, each timestamp generated for a respective edit can be added to a corresponding edit mapping stored at edit data structure 260, in accordance with embodiments described below.

In some embodiments, edit data collection component 222 can determine coordinates associated with a section of the electronic document that includes object edit 252. In some embodiments, each electronic document supported by platform 120 can be associated with a set of coordinates each corresponding to a respective section of the document. In some embodiments, the set of coordinates can be defined based on a document template for the electronic document. The coordinates can be previously defined for the electronic document (e.g., by a developer of platform 120, etc.), in some embodiments. In an illustrative example, a word document supported by platform 120 can be created based on a word document template. Each word document created by the template can include one or more pages each corresponding to a fixed page size and shape (e.g., a rectangular page having a size of 8.5"×11," etc.), in some embodiments. Each page of the word document can include multiple sections that can include one or more content objects (e.g., as provided by the user). In some embodiments, a size of each section can correspond to a size of a smallest unit of a content object associated with the word document. For example, the size of each section can correspond to a size associated with an alphanumeric character, a symbolic character, and so forth. Each section can be associated with a respective coordinate, in some embodiments. For example, a section located at an upper most region and left most region of a page of the word document can be associated with a coordinate of (0, 0). A section located at the upper most region and the right most region of the page can be associated with a coordinate of (0, X). A section located at the bottom most region and the left most region of the page can be associated with a coordinate of (X, 0). A section located at the bottom most region and the right most region of the page can be associated with a coordinate of (X, X).

In other or similar embodiments, the document template can restrict the inclusion of content objects at one or more regions of an electronic document. For example, a document template can restrict content objects from being included at regions that are adjacent to one or more edges of a respective page of a word document (e.g., regions around a border of the respective page). Such regions are also referred to as page margins and, in some embodiments, can be configured and/or adjusted by the user (e.g., via the platform GUI). Regions of each page that are permitted to include content objects (referred to below as non-restricted regions) can be broken into multiple sections, as described above. In one example, a section located at the upper most part and the left most part of the non-restricted region of each page can be associated with a coordinate of (0, 0). A section included at the lower most part and the right most part of the non-restricted region of each page can be associated with a coordinate of (X, X). In yet other or similar embodiments, the section of a page associated with a coordinate of (0, 0) can be included in any region of the page. It should be noted that although the above provided examples relate to word documents, embodiments of the present disclosure can be applied to any type of electronic document. For example, the section including the uppermost and left most cell of a spreadsheet document can be associated with a coordinate of (0, 0) and the section including the lower most and right most cell of the spreadsheet can be associated with a coordinate of (X, X). In another example, for a respective slide of a slide presentation document, the upper most and left most section of the respective slide can be associated with a coordinate of (0, 0) and the lower most and right most section of the respective slide can be associated with a coordinate of (X, X).

In accordance with the example of FIG. 3B, edit data collection component 222 can determine the section including the first edit (e.g., the addition of the alphanumeric character "H") is associated with the coordinate of (0, 0), the section including the second edit (e.g., the addition of alphanumeric character "E") is associated with the coordinate of (0, 1), and the section including the third edit (e.g., the addition of alphanumeric character "O") is associated with the coordinate of (0, 2). In some embodiments, edit data collection component 222 can store an indication of the determined coordinates for the first, second, and third edits as edit coordinate(s) 256 at memory 250. In additional or alternative embodiments, the determined coordinates for each respective edit can be added to a corresponding edit mapping stored at edit data structure 260, in accordance with embodiments described below.

In some embodiments, edit data collection component 222 can additionally obtain information associated with the user that provided one or more detected edits. In some embodiments, the editor information 258 can include an identifier associated with a user that provided the edits (e.g., a username, etc.). In other or similar embodiments, the editor information 258 can include an identifier associated with a client device 102 of the user. Edit data collection component 222 can store the obtained user information as editor information 258, in some embodiments. In additional or alternative embodiments, the obtained user information associated with each respective edit can be added to a corresponding edit mapping stored at edit data structure 260, in accordance with embodiments described below.

In accordance with previously described embodiments, edit mapping component 224 can generate an edit mapping for information associated with each respective edit made to the electronic document. For example, for each of the first, second, and third edits made to section 314 of the electronic document of FIG. 3A, edit mapping component 224 can generate a mapping between the determined type for each respective edit (e.g., data of object edit 252), a timestamp generated for each respective edit (e.g., data of edit timestamp 254), and a coordinate generated for each respective edit (e.g., data of edit coordinate 256). In some additional or alternative embodiments, the generated mapping can also include an indication of information associated with a user that provided the respective edit (e.g., data of editor information 258). In some embodiments, each mapping generated by edit mapping component 224 can be included in a respective entry of edit data structure 260. As illustrated in FIG. 3B, edit data structure 260 can include one or more entries 324 that each correspond to a respective edit (e.g., the first edit, the second edit, the third edit, etc.) made to section 314 of the electronic document. Each entry 324 can include a timestamp field 326, an edit type field 328 and/or an edit coordinate field 330. In some embodiments, each entry 324 can additionally include an editor information field (not shown).

Responsive to obtaining data (e.g., object edit data 252, edit timestamp data 254, edit coordinate data 256 and/or editor information data 258) for a respective edit from edit data collection component 222, edit mapping component 224 can add an entry 324 to edit data structure 260 corresponding to the respective edit. Edit mapping component 224 can update the timestamp field 326 for the added entry 324 to include an indication of the timestamp data 254 associated with the respective edit, the edit type field 328 to include an indication of the object edit data 252 associated with the respective edit, and/or the coordinate field 330 to include an indication of the edit coordinate data 256 associated with the respective edit. The data added to fields 326, 328, 330 of the added entry 324 can correspond to a mapping generated for the respective edit.

It should be noted that, in some embodiments, edit mapping component 224 may only add entries 324 to edit data structure 260 and may not edit or modify entries 324 of edit data structure 260. By only adding entries 324 to edit data structure 260, edit mapping engine 141 may maintain a log of each edit made to the electronic document, regardless of whether the edits remain in a later version of the electronic document. For example, as illustrated in FIG. 3C, a user editing section 314 of the electronic document can remove the letter 322 "O" from section 314 and can add the letters 332 "L," "L," and "O" to section 314, in accordance with previously described embodiments. Responsive to edit detection component 220 detecting the edits involving letters 322 and 332, edit data collection component 222 can collect data associated with the detected edits, as described above. Edit mapping component 224 can update edit data structure 260 to include entries corresponding to the detected edits, as described above. For example, as illustrated in FIG. 3C, edit mapping component 224 can add an entry 324A indicating that the letter 322 "O" was removed from a region of section 314 having coordinates of (0, 2) at a time associated with timestamp "T3." Edit mapping component 224 can add additional entries (e.g., 324B, 324C, and/or 324D), which include data with the letters 332 "L," "L," and "O." added to section 314, as described above.

It should be noted that, in an additional or alternative illustrative example, the user may not remove the letter 322 "O" from the text string included in section 314. Instead, the user may add the letters 332 "L" and "L" between letter 322 "E" and letter 322 "O." In such illustrative example, edit mapping component 224 may add additional entries to edit data structure 260 indicating, for instance, that at a time associated with timestamp "T3," an edit was made to add letter 332 "L" to a region having coordinate (0, 2) and at the same time, an edit was made to shift a position of letter 322 "O" to a region having coordinate (0, 3). The additional entries can further indicate, for instance, that at a time associated with timestamp "T4," another edit was made to add letter 322 "L" to the region having coordinate (0, 3) and at the same time, an edit was made to shift the position of letter 322 "O" to a region having a coordinate of (0, 4).

Figures 3D, 3E:
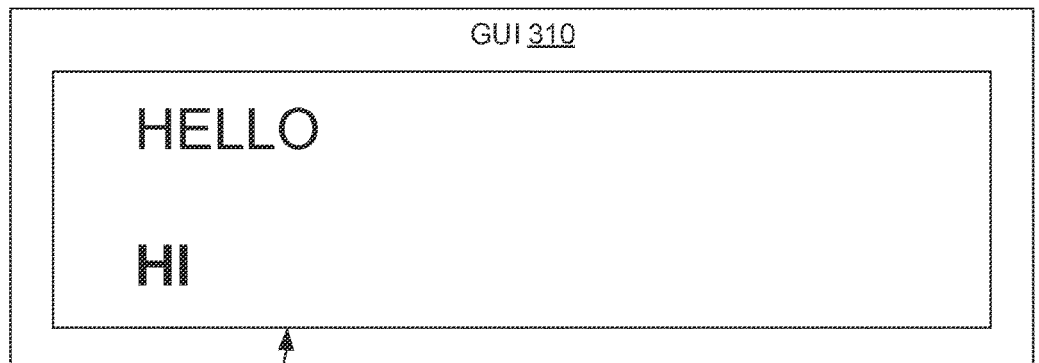

FIGS. 3D-3E illustrate additional or alternative example edits made to an electronic document by a user of platform 120, in accordance with embodiments of the present disclosure. As illustrated in FIG. 3D, a user can provide additional text objects 312 to be included in section 350 of the electronic document. Section 350 can be located adjacent to or otherwise near section 314 of the electronic document, as described with respect to FIG. 3A. In an illustrative example, the additional text objects 312 can correspond to the text string "HI," as illustrated in FIG. 3D. The text objects 312 of the text string "HI," can have a bold formatting or style.

As illustrated in FIG. 3E, the user providing the edits to section 350 can add a space 360 below section 314 (e.g., as indicated by "/space.") by engaging with a peripheral device included within or coupled to client device 102 and/or engaging with one or more elements of the platform GUI, in accordance with previously described embodiments. Edit data collection component 322 can generate a timestamp that indicates that the edit was provided and/or detected at or around time "T20." When the space 360 was provided, a cursor of the electronic document may have moved to a region of section 350 associated with coordinate (1, 0). In view of the above, edit mapping component 224 can add an entry 324E to edit data structure 260. The timestamp field 326 of entry 324E can include an indication of the timestamp generated by edit data collection component 222, the edit type field 328 can include an indication of the type of edit made by the user, and the edit coordinate field 330 can include an indication of the coordinate associated with the edit, as described above. At times T21 and T22, the user can add letters 362 (e.g., "H" and "I") to regions associated with coordinates (1, 0) and (1, 1), respectively. At time T23, the user can modify a style 364 associated with the letters 362 "H" and "I" to be bold (e.g., as indicated by "style=bold."). Edit mapping component 224 can add entries to edit data structure 260 that correspond to the provided edits (e.g., entries 324F, 324G, 324H, etc.), in accordance with previously described embodiments.

Edit mapping engine 141 can collect data for each edit made by a user and can add entries to edit data structure 260 for each edit, as described above. In some embodiments, document version engine 151 can use the data included in entries of edit data structure 260 to generate versions of the electronic document, as described with respect to FIGS. 2B and 4A-5C. As indicated previously, although some embodiments and/or examples of the present disclosure are directed to adding, removing, or modifying text objects in an electronic document, such embodiments and/or examples can be applied to adding, removing, and/or modifying any type of content object in any type of document.

Figure 2B:
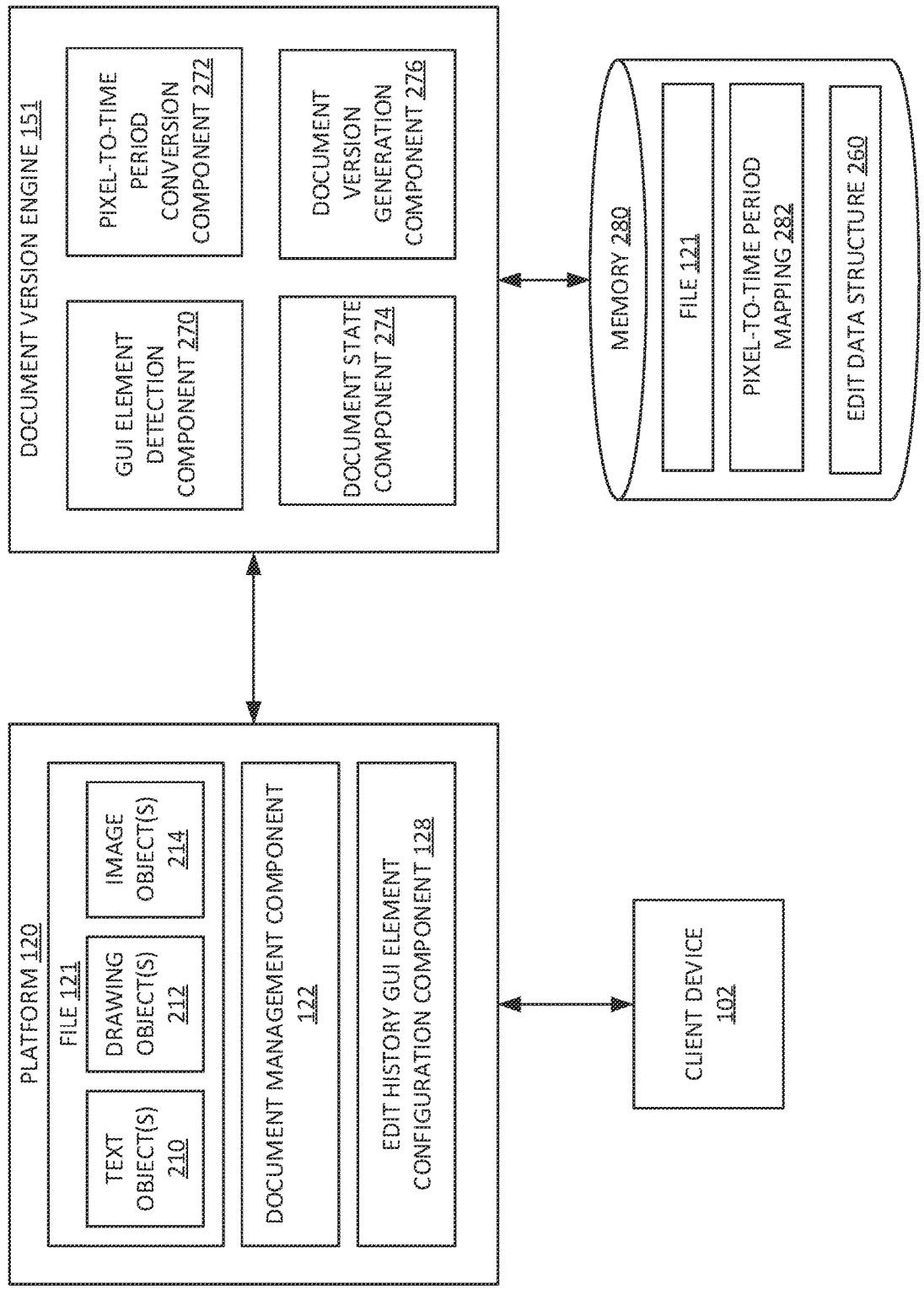
FIG. 2B is a block diagram illustrating an example platform and a document version engine, in accordance with implementations of the present disclosure.

FIG. 2B is a block diagram illustrating an example platform 120 and a document version engine 151, in accordance with implementations of the present disclosure. As described above, platform 120 can include a file 121, a document management component 122, and/or an edit history GUI element configuration component 128. Platform 120 can be connected (e.g., via network 108) to one or more client devices 102. Document version engine 151 can include a GUI element detection component 270, a pixel-to-time period conversion component 272, a document state component 274, and/or a document version generation component 276. In some embodiments, platform 120 and/or document version engine 151 can be connected to memory 280 (e.g., via a network such as network 108, via a bus, etc.). In some embodiments, one or more portions of memory 280 can correspond to memory 250. In additional or alternative embodiments, one or more portions of memory 280 can correspond to data store 110. One or more portions of memory 280 can additionally or alternatively correspond to a memory of client device 102 and/or another memory associated with system 100, in some embodiments.

In accordance with previously described embodiments, a first user of platform 120 can access and/or provide edits to an electronic document. In some embodiments, a client device associated with a second user of the platform 120 can transmit a request to platform 120 to access the electronic document. Responsive to determining that the second user is permitted to access the electronic document, document management component 122 can provide the client device 102 associated with the second user with access to the electronic document (e.g., via the platform GUI).

Figure 4A:
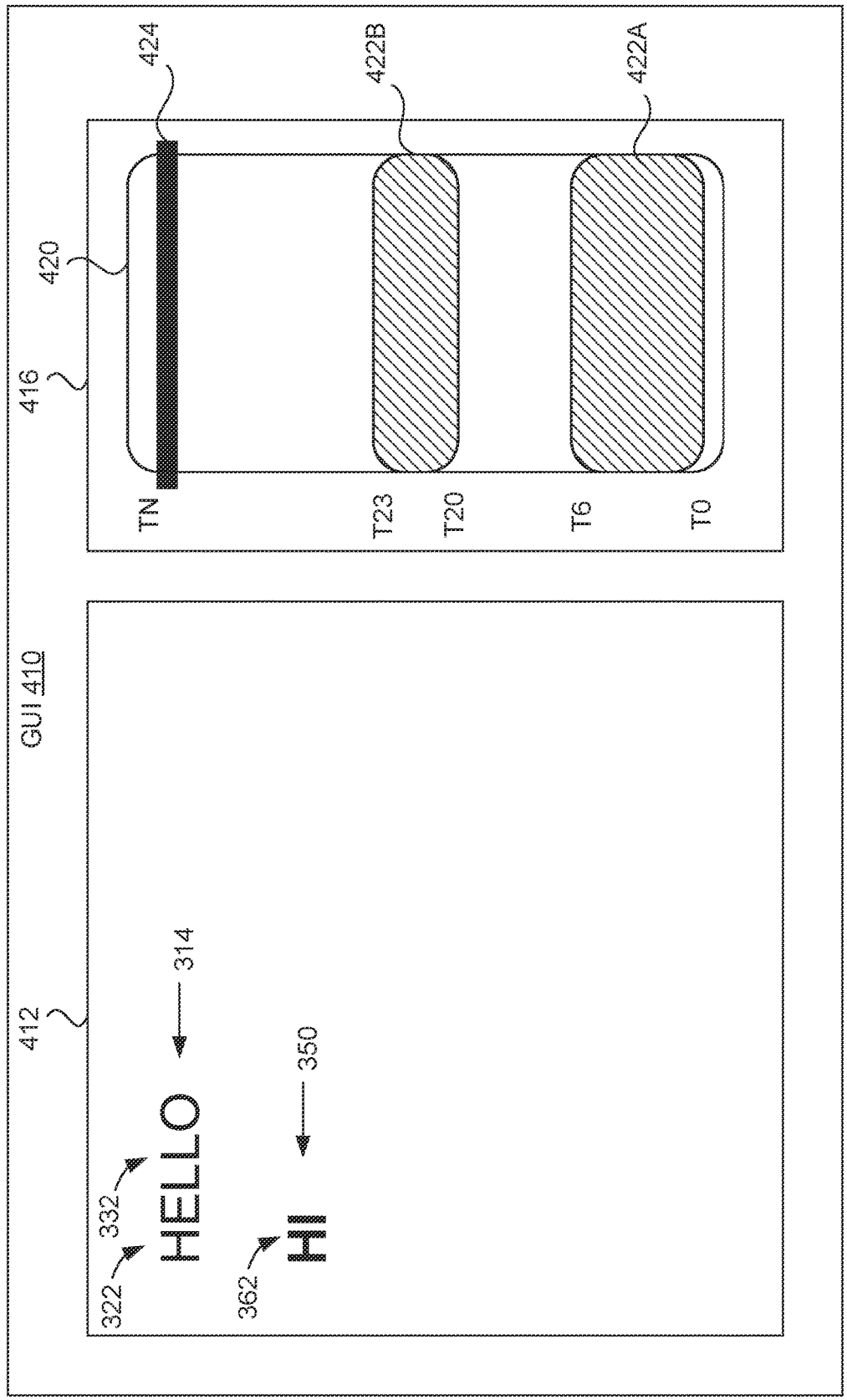
FIGS. 4A-4C illustrate an example of providing one or more previous versions of an electronic document based on mappings included in an edit data structure, in accordance with implementations of the present disclosure.
Figure 4B:
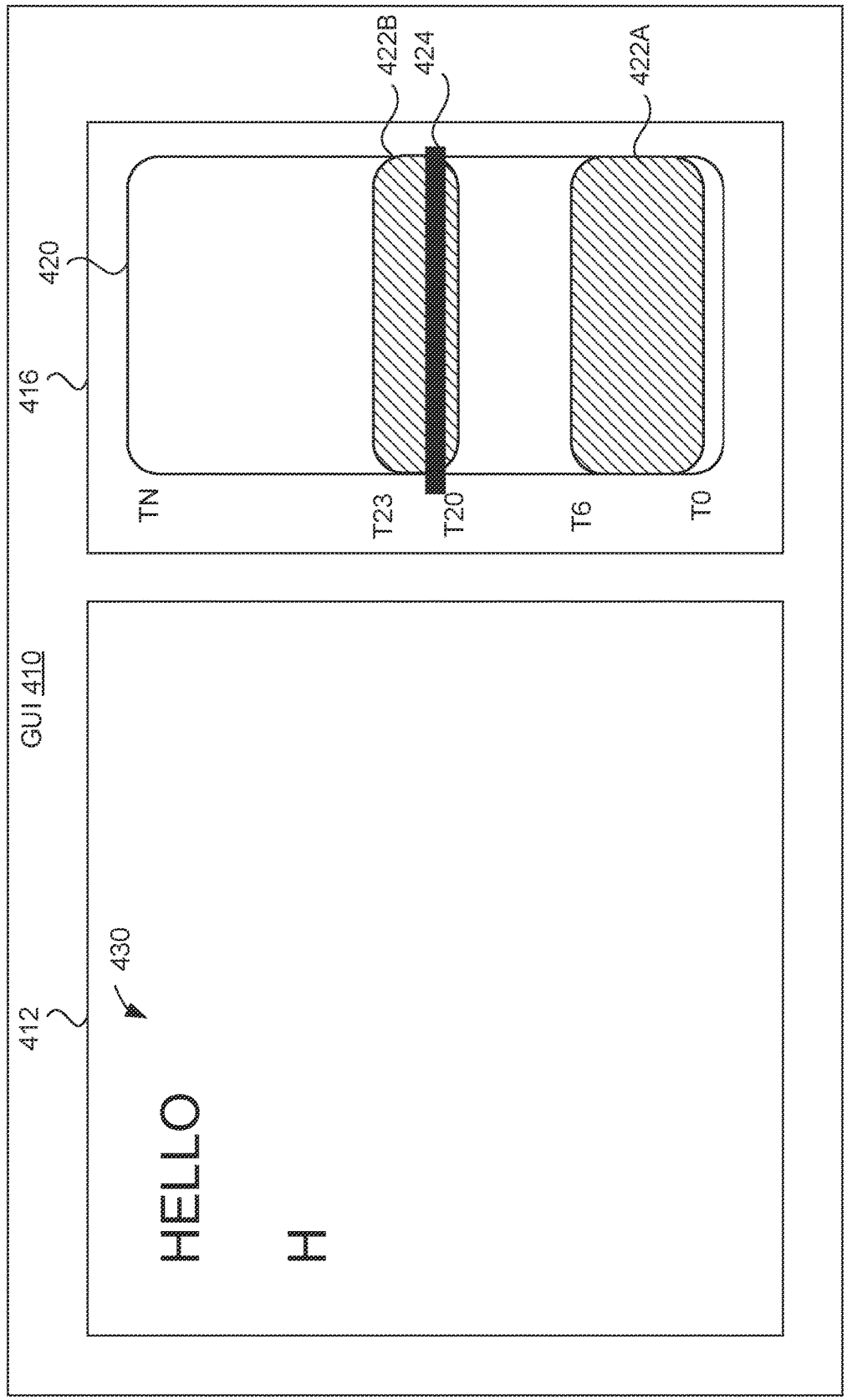
Figure 4C:
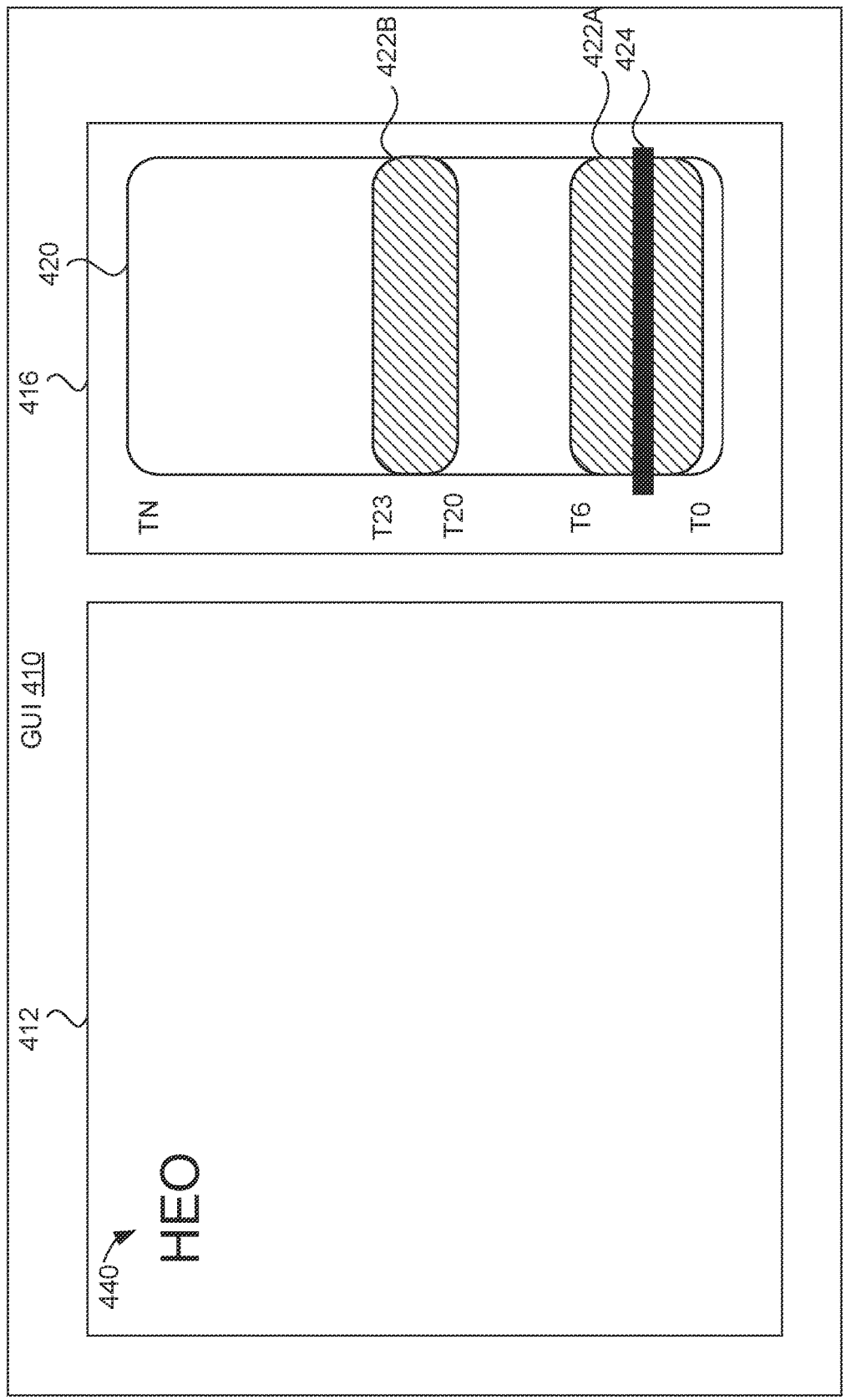

FIGS. 4A-4C illustrate an example of providing one or more previous versions of an electronic document based on mappings included in an edit data structure, in accordance with implementations of the present disclosure. GUI 410 of FIG. 4A can correspond to a view of the platform GUI provided by platform 120. As illustrated in FIG. 4A, GUI 410 can include a first region 412 and a second region 416. The first region 412 can be configured to provide one or more sections of an electronic document. For example, first region 412 of GUI 410 can provide sections 314 and 350 of the electronic document that was edited by a user in accordance with previously described embodiments. As illustrated in FIG. 4A, section 314 of the electronic document can include edits made by a user (e.g., the first user) of platform 120 with respect to letters 322 and 332, as described with respect to FIGS. 3A-3C. Section 350 of the electronic document can include edits made by the first user with respect to letters 362, as described with respect to FIGS. 3D-3E.

The second region 416 of GUI 410 can include an edit history GUI element 420. Edit history GUI element 420 can enable a user (e.g., the second user) of platform 120 to access edits made to the electronic between an initial time period associated with the electronic document (e.g., a time period at or around when the electronic document was created) and a time period at which or around which the user is accessing the electronic document (referred to as a current time period). In some embodiments, edit history GUI element 420 can be configured by edit history GUI element configuration component 128 (simply referred to as configuration component 128 herein). For example, in response to detecting that a user (e.g., the first user, the second user) has requested access to an electronic document, configuration component 128 can determine whether metadata associated with the electronic document includes edit mappings associated with the electronic document. Configuration component 128 can determine whether the document metadata includes edit mappings by accessing memory 250 (or data store 110 and/or another memory of system 100) and determining whether object edit data 252, edit timestamp data 254, edit coordinate data 256, and/or editor information data 258 is stored at memory 250 (e.g., by edit data collection component 222). Additionally or alternatively, configuration component 128 can determine whether edit data structure 260 includes entries corresponding to such data.

In response to determining that the document metadata includes the edit mappings for the electronic document, configuration component 128 can obtain the edit mappings (e.g., from memory 250) and use the obtained edit mappings to configure edit history GUI element 420. In some embodiments, configuration component 128 can configure edit history GUI element 420 to include one or more portions each corresponding to time periods between the initial time period and the current time period associated with the electronic document. For purposes of illustration only, edit history GUI element 420 can include multiple portions, where each portion corresponds to a time period between and/or including time T0 (e.g., the initial time period) and time TN (e.g., the current time period). In some embodiments, each time period corresponding to a respective portion of edit history GUI element 420 can be of a fixed interval. For example, each time period between and including times T0 and TN can correspond to approximately one second. Accordingly, each portion of edit history GUI element 420 can correspond to a respective one second interval between times T0 and TN.

Configuration component 128 can further configure edit history GUI element 420 to include GUI components 422, which indicate time periods in the timeline between times T0 and TN at which edits were provided to the electronic document. As illustrated in FIG. 4A, edit history GUI element 420 can include a first GUI component 422A and a second GUI component 422B. The first GUI component 422A can indicate (e.g., to a user) that edits were made to the electronic document between time T0 and time T6 (e.g., in accordance with embodiments described with respect to FIGS. 3B-3C). The second GUI component 422B can indicate (e.g., to a user) that edits were made to the electronic document between time T20 and time T23 (e.g., in accordance with embodiments described with respect to FIG. 3E). In some embodiments, configuration component 128 can configure first GUI component 422A and/or second GUI component 422B to indicate a particular user that provided the corresponding edits. For example, as illustrated in FIG. 4A, first GUI component 422A and second GUI component 422B can each have the same or a similar color, pattern, shading, etc. The color, pattern, shading, etc. can be associated with the first user of the platform and therefore can indicate to the second user that the first user provided the edits between times T0 and T6 and times T20 and T23. If different users provided such edits, configuration component 128 may configure first GUI component 422A to have a different color, pattern, shading, etc. from second GUI component 422B, in accordance with embodiments described with respect to FIGS. 5A-5C.

In some embodiments, configuration component 128 can associate each portion of edit history GUI element 420 with a respective set of pixels of GUI 410. For example, configuration component 128 can determine one or more sets of pixels of GUI 410 that include renderings of portions of edit history GUI element 420. For each portion of edit history GUI element 420, configuration component 128 can generate a mapping between a time period associated with the respective portion and the set of pixels that includes the rendering of the respective portion. Such mapping is referred to herein as a pixel-to-time period mapping or simply pixel mapping. In accordance with the example illustrated in FIG. 4A, configuration component 128 can generate a first mapping associating a first set of pixels with a time period "T0" associated with a first portion of edit history GUI element 420, a second mapping associating a second set of pixels with a time period "T1" associated with a second portion of edit history GUI element 420, and so forth. Configuration component 128 can store the generating mappings at memory 280 as pixel-to-time period mapping(s) 282.

Responsive to configuring edit history GUI element 420, configuration component 128 can render edit history GUI element 420 for presentation via the second region 416 of GUI 410. In some embodiments, edit history GUI element 420 can include a selection component 424. A user (e.g., the second user) can interact with selection component 424 to select a particular portion of edit history GUI element 420. In one example, selection component 424 can be a slider bar component and the user can drag (e.g., using a mouse or a touchscreen) the slider bar component to a particular portion of edit history GUI element 420. In another example, a user can select (e.g., using a mouse or a touchscreen) the particular portion of the edit history GUI element 420. The second region 416 of GUI 410 can be updated to provide the selection component 424 at the user-selected portion of the edit history GUI element 420 (e.g., responsive to receiving an indication of the user selection).

In some embodiments, GUI element detection component 270 can detect that a user has engaged with selection component 424 and/or a respective portion of edit history GUI element 420. For example, responsive to the user selecting a particular portion of the edit history GUI element 420, platform 120 can provide a notification indicating the selection to document version engine 151. GUI element detection component 270 can receive the notification and therefore can detect that the user has engaged with selection component 424 and/or the respective portion of edit history GUI element 420. In some embodiments, the notification can include an indication of one or more pixels of GUI 410 associated with the user-selection.

Pixel-to-time period conversion component 272 can extract the indication of the one or more pixels from the received notification and can determine a timestamp associated with the one or more pixels using the pixel-to-time period mapping(s) 282. As indicated above, the pixel-to-time period mapping(s) 282 include a mapping between a set of pixels of GUI 410 and a time period associated with a portion of edit history GUI element 420. Pixel-to-time period conversion component 272 can identify a set of pixels that includes the one or more pixels extracted from the received notification and can determine a mapping 282 that corresponds to the identified set of pixels. Pixel-to-time period conversion component 272 can determine a time period associated with the portion of edit history GUI element 420 based on the determined mapping, in some embodiments.

Document state component 274 can determine a state of the electronic document at the time period determined by pixel-to-time period conversion component 272. A state of an electronic document can correspond to one or more edits made to the electronic document from the initial time period associated with the electronic document to the determined time period. In some embodiments, document state component 274 can determine the state of the electronic document using the edit data structure 260. As described above, edit data structure 260 can include one or more entries 324 that each include a mapping between a timestamp indicating a time period at which an edit was made to the electronic document, a type of the edit that was made to the electronic document, and coordinates associated with a section of the electronic document that includes the edit. Document state component 274 can identify an entry of edit data structure 260 including a timestamp corresponding to the time period associated with the determined portion of edit history GUI element 420. Responsive to identifying the corresponding entry, document state component 274 can identify entries for each edit that was made to the electronic document from the initial time period to the time period of the identified entry. Document state component 274 can extract, from each identified entry, a type of edit that was made and coordinates for sections of the electronic document that includes each edit. Document state component 274 can provide the extracted information to document version generation component 276. Document version generation component 276 can generate a version of the electronic document that includes the edits indicated by the extracted information and can render the generated version for presentation via the first region 412 of GUI 410.

In an illustrative example, the second user can engage with edit history GUI element 420 to move selection component 424 to a particular portion of edit history GUI element 420. In accordance with the example illustrated in FIG. 4B, the user-selected portion of edit history GUI element 420 can correspond to time period "T20." GUI element detection component 270 can detect the user selection and pixel-to-time period conversion component 272 can identify the corresponding time period (e.g., time period "T20") based on the set of pixels associated with the region of GUI 410 including the user-selection, as described above. Document state component 274 can identify an entry of edit data structure 260 that corresponds to the identified time period and can extract data corresponding to the document state at the identified time period, in accordance with previously described embodiments. Document version generation component 276 can generate the prior version 430 of the electronic document and can render the prior version 430 for presentation via region 412 of GUI 410. As illustrated in FIG. 4B, the prior version 430 can include edits made to the electronic document up until a time associated with timestamp T20. For example, prior version 430 can include edits involving letters 322 and 332 (e.g., "HELLO") provided to portion 314 of the electronic document and letter 362 (e.g., "H") provided to portion 350.

As illustrated in FIG. 4C, the user can engage with edit history GUI element 420 to move selection component 424 to another portion of edit history GUI element 420. The other portion of edit history GUI element 420 can correspond to a time period associated with time stamp T2. Document version engine 151 can generate another prior version 440 of the electronic document and can render the prior version 440 for presentation via region 412 of GUI 410, as described above. As illustrated in FIG. 4C, the prior version 440 can include edits made to the electronic document up until a time associated with timestamp T2. For example, prior version 440 can include edits involving letters 322 (e.g., "HEO") provided to portion 314 of the electronic document.

In some embodiments, pixels associated with a user selection may not correspond to a time period associated with a timestamp generated for an edit (e.g., by edit mapping engine 141). For example, the second user may engage with edit history GUI element 420 to move selection component 424 to a portion of edit history GUI element 420 that is located between pixels associated with the time period "T6" and the time period "T20." For instance, pixel-to-time period conversion component 272 can determine that the set of pixels associated with the user selection corresponds to a time period "T15." In some embodiments, document state component 274 can identify an entry of edit data structure 260 having a timestamp that satisfies a time period criterion in view of the determined time period. A timestamp can satisfy a time period criterion if it is the timestamp that is closes to the time period. For example, document state component 274 may identify an entry including a timestamp of "T20" satisfies the time period criterion (e.g., as time "T15" is closer to time "T20" than time "T6"). In other or similar embodiments, a timestamp can satisfy the time period criterion if the timestamp corresponds to most recent edits that were made up to the time period. For example, document state component 274 may determine that an entry including timestamp of "T6" satisfies the time period criterion, as such timestamp corresponds to most recent edits that were made up to time period "T15." Document version generation component 276 can generate a rendering of the prior version of the document, based on the one or more identified entries, in accordance with previously described embodiments.

Figure 5A:
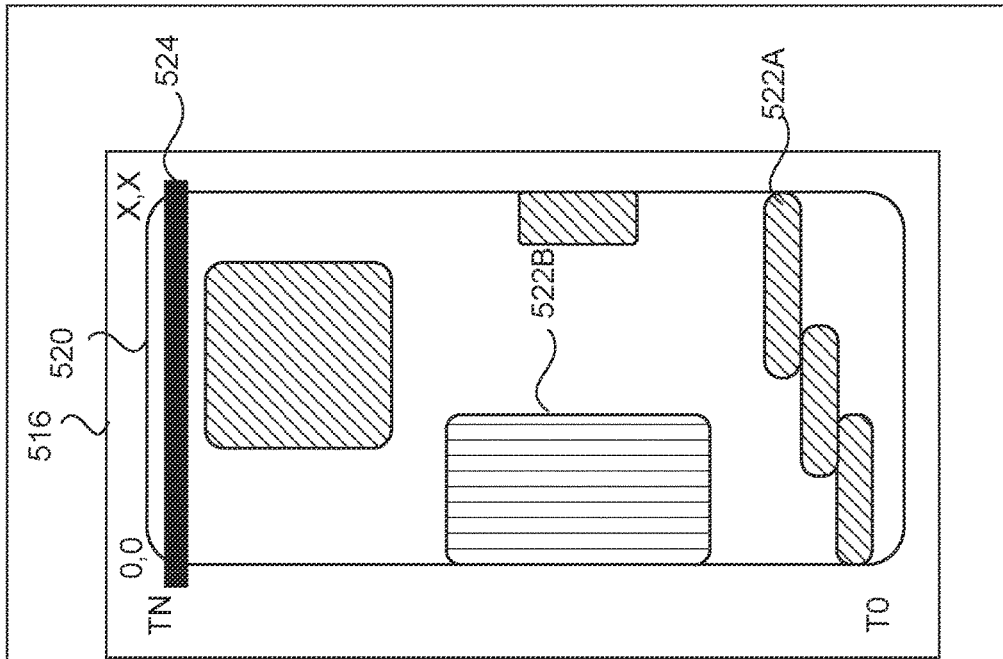
FIGS. 5A-5C illustrate another example of providing one or more previous versions of an electronic document based on mappings included in an edit data structure, in accordance with implementations of the present disclosure.
Figure 5B:
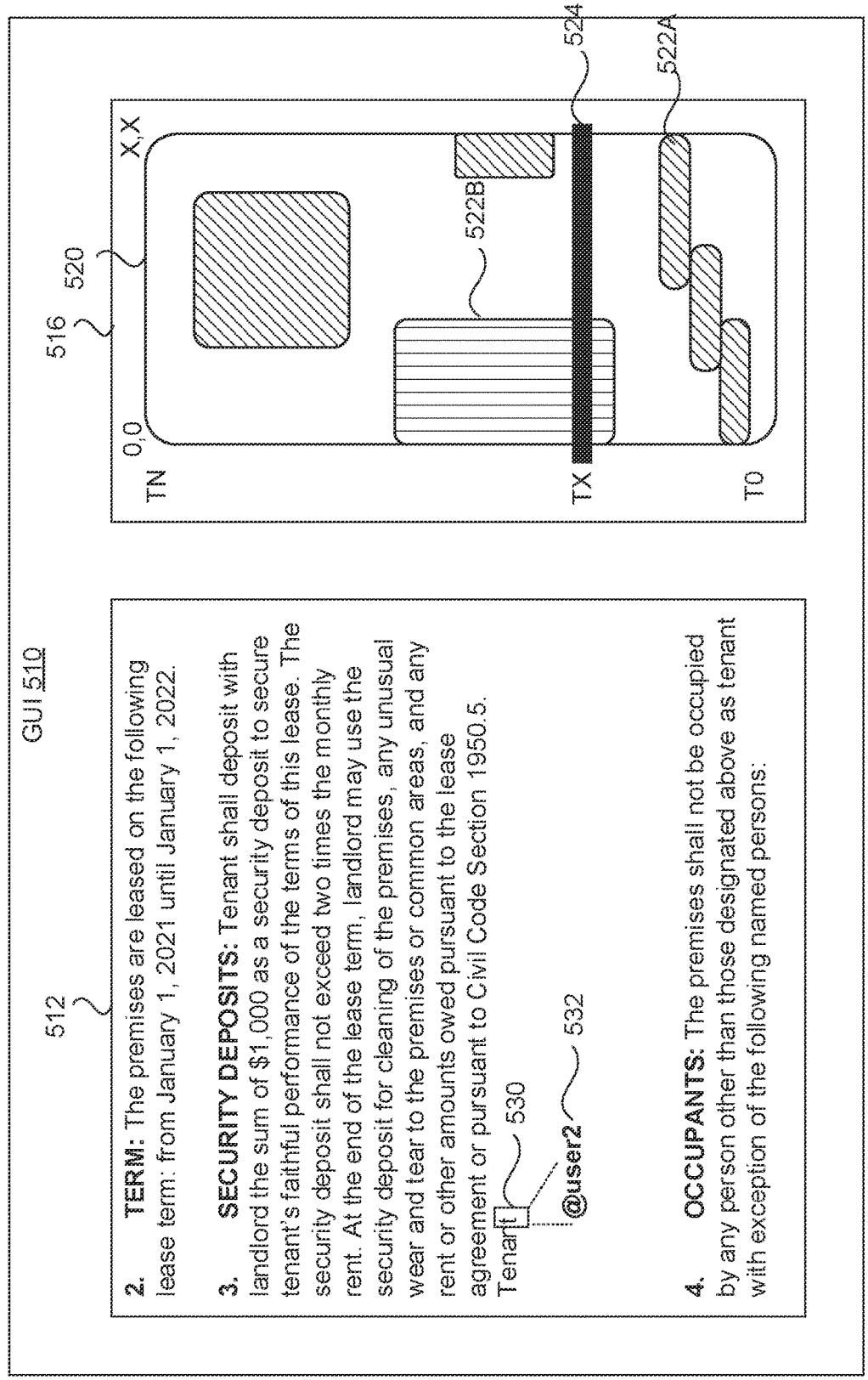
Figure 5C:
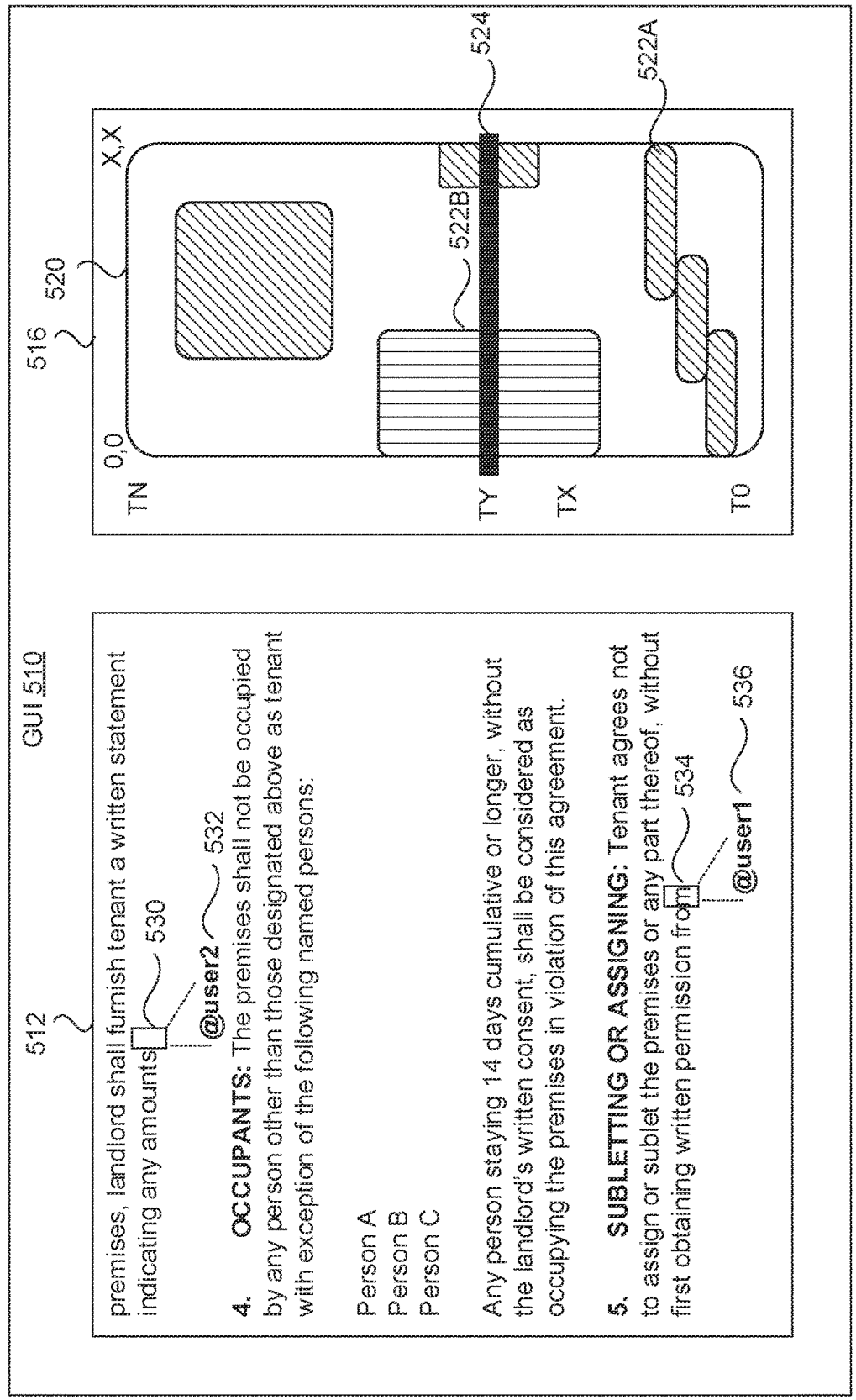

FIGS. 5A-5C illustrate another example of providing one or more previous versions of an electronic document based on mappings included in an edit data structure, in accordance with implementations of the present disclosure. As illustrated in FIG. 5A, one or more sections of an electronic document (e.g., corresponding to a lease agreement) can be provided in a first portion 512 of GUI 510. A second portion 516 of GUI 510 can include an edit history GUI element 520 configured by configuration component 128, in accordance with previously described embodiments. Configuration component 128 can configure edit history GUI element 520 based on mappings included in edit data structure 260, as described above. In an illustrative example, the electronic document provided via the first portion 512 of GUI 510 may have been edited by multiple users. As illustrated in FIG. 5A, configuration component 128 can configure edit history GUI element 520 to include multiple components 522 each corresponding to edits made by a respective user of platform 120. One or more first components 522A can have a first color, style, shading etc., to indicate edits made by a first user of platform 120. One or more second components 522B can have a second color, style, shading, etc., to indicate edits made by a second user of platform 120.

In some embodiments, configuration component 128 can place first components 522A and/or second components 522B at a region of edit history GUI element 520 that corresponds to a particular section of the electronic document that includes respective edits. For example, a left most region of edit history GUI element 520 can correspond to a top most section of the electronic document (e.g., indicated by coordinates (0, 0) in FIG. 5A), while a right most region of edit history GUI element 520 corresponds to a bottom most section of the electronic document (e.g., indicated by coordinates (X, X)). To represent edits made at or around the top most section of the electronic document, configuration component 128 can include one or more components 522 at or around the left most region of edit history GUI element 520. Similarly, to represent edits made at or around the bottom most section of the electronic document, configuration component 128 can include one or more components 522 at or around the right most region of edit history GUI element 520. Configuration component 128 can also place components 522 in accordance with a time period at which edits associated with the components 522 were made to the electronic document, as described above with respect to FIGS. 4A-4C.

As illustrated in FIG. 5A, edit history GUI element 520 can include a selection component 424, as described above. A user (e.g., the first user, the second user, an additional user, etc.) can engage with the selection component 524 and/or a respective portion of edit history GUI element 520, in accordance with previously described embodiments. In one example, the user-selected portion of edit history GUI element 520 can correspond to time period "TX." Document version engine 151 can generate a prior version of the electronic document including edits made up until time period "TX" and can provide a rendering of the generated prior version for presentation via the first portion 512 of GUI 510, in accordance with previously described embodiments.

FIG. 5B illustrates an example of the prior version of the electronic document including the edits made up until time period "TX." In some embodiments, the first portion 512 of GUI 510 can include a GUI element 530 at a region of the electronic document that was most recently edited at or around time period "TX." In accordance with the example illustrated in FIG. 5B, a most recent edit made at or around time period "TX" may have been to add a letter "t" to a text string "Tenant" in the electronic document. GUI element 530 can indicate (e.g., to the first user, to the second user, to another user) the particular region of the electronic document that includes such edit. GUI element 530 can include any type of element that highlights or otherwise draws attention to the particular region of the electronic document provided via the first portion 512 of GUI 510. For example, GUI element 530 can include a highlighter element overlayed on top of the edit, an underline element placed below the edit, a circle or other shaped element overlayed on top of the edit, and so forth. In additional or alternative embodiments, the first portion 512 of GUI 510 can include a GUI element 532 indicating a particular user that provided the edit to the region indicated by GUI element 530. GUI element 532 can include, for example, an identifier associated with the particular user, an identifier associated with an account of the particular user (e.g., a username), an identifier associated with a client device of the particular user, and so forth.

As illustrated in FIG. 5C, a user can engage with selection component 524 and/or a respective portion of edit history GUI element 520 to select a portion of GUI element 520 corresponding to time period "TY." Document version engine 151 can generate another prior version of the electronic document including edits made up until time period "TY" and can provide a rendering of the generated prior version for presentation via the first portion 512 of GUI 510, as described above. As illustrated in FIG. 5C, the first portion 512 of GUI 510 can include GUI elements 530 and 532, as described above. In some embodiments, GUI element 530 can be updated to indicate the most recent edit made by a particular user (e.g., user 2) at or around time period "TY." As indicated by the components 522 of the edit history GUI element 520, multiple users (e.g., user 1 and user 2) provided edits to the document at or around time period "TY." Accordingly, the first portion 512 of GUI 510 can also include GUI element 534, which indicates a particular region of the electronic document that includes edits provided by user 1. GUI element 534 can be the same or a similar type of element as GUI element 530, in some embodiments. In additional or alternative embodiments, the first portion 512 of GUI 510 can also include a GUI element 536, which indicates a particular user (e.g., user 1) that provided the edit to the region indicated by GUI element 534. GUI element 536 can be the same or a similar type of element as GUI element 532, in some embodiments.

In some embodiments, the rendering of the prior version can include different and/or additional sections of the electronic document. For example, as illustrated in FIG. 5C, the prior version of the electronic document that is provided via the first portion 512 of GUI 510 can include one or more additional sections (e.g., relating to Occupants, Subletting or Assigning, etc.). As also illustrated in FIG. 5C, the prior version of the electronic document does not include sections that were included in the prior version illustrated in FIG. 5B (e.g., relating to Term, Security Deposits, etc.). In some embodiments, the first portion 512 of GUI 510 may not be large enough to present each edit made by every user of platform 120 at or around a respective time period. In such embodiments, the first portion 512 may present edits made by one or more users. A user accessing the electronic document may navigate throughout the electronic document (e.g., by scrolling) to identify regions of the electronic document that include edits from other users at or around the respective time period, in some embodiments.

Figure 6:
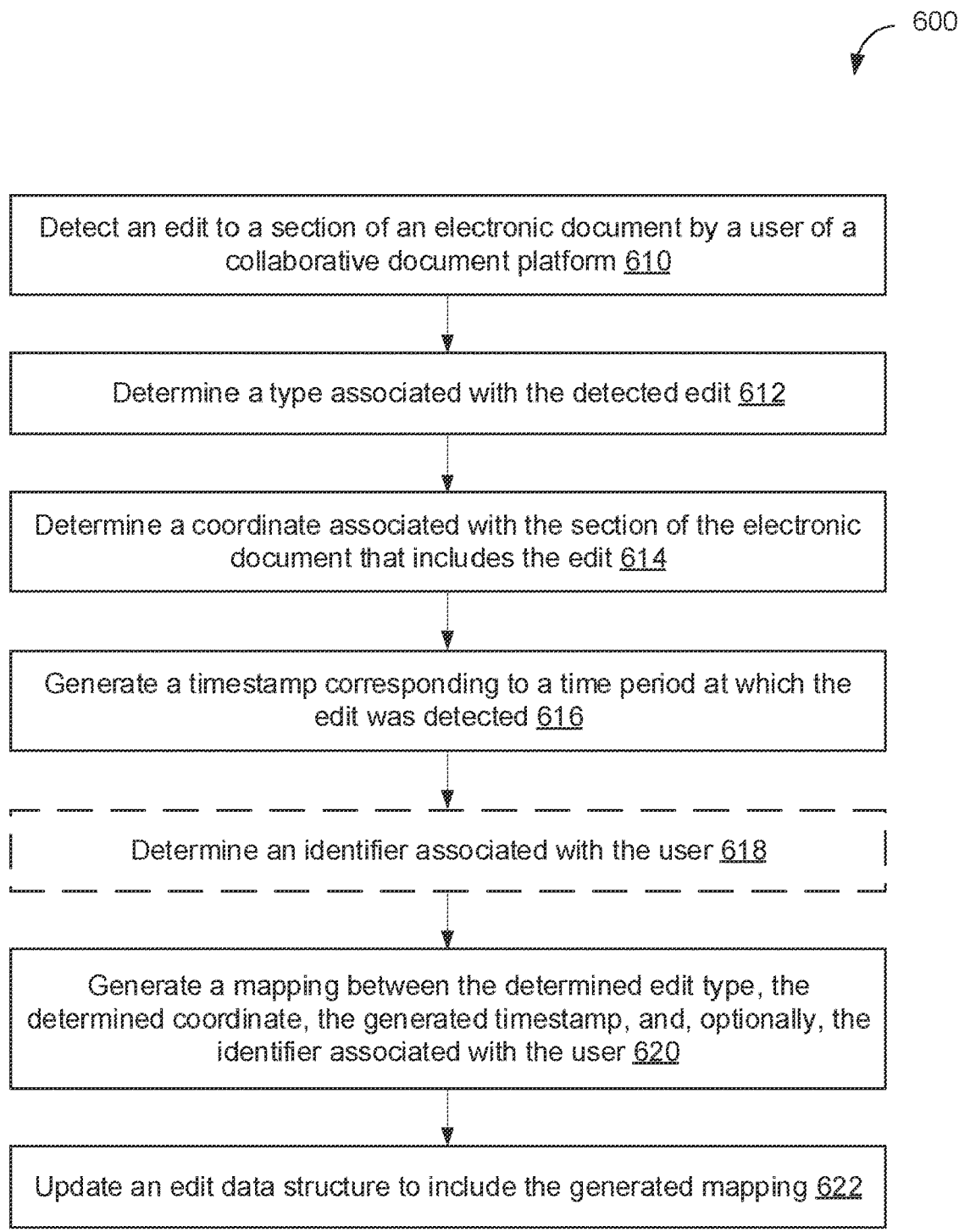
FIG. 6 depicts a flow diagram of an example method for updating an edit data structure to include mappings associated with edits made by users of a platform, in accordance with implementations of the present disclosure.

FIG. 6 depicts a flow diagram of an example method 600 for updating an edit data structure to include mappings associated with edits made by users of a platform, in accordance with implementations of the present disclosure. Method 600 can be performed by processing logic that can include hardware (circuitry, dedicated logic, etc.), software (e.g., instructions run on a processing device), or a combination thereof. In one implementation, some or all of the operations of method 600 can be performed by one or more components of system 100 of FIG. 1. In some embodiments, some or all of the operations of method 600 can be performed by edit mapping engine 141, as described above.

At block 610, processing logic can detect an edit to a section of an electronic document by a user of a collaborative document platform. The collaborative document platform can correspond to platform 120, as described above. Edit detection component 220 can detect the edit, in accordance with previously described embodiments. At block 612, processing logic can determine a type associated with the detected edit. At block 614, processing logic can determine a coordinate associated with a section of the electronic document that includes the edit. At block 616, processing logic can generate a timestamp corresponding to a time period at which the edit was detected. At block 618, processing logic can, optionally, determine an identifier associated with the user. Edit data collection component 222 can obtain the edit type, the coordinate, the timestamp, and the user identifier, in accordance with previously described embodiments. At block 620, processing logic can generate a mapping between the determined edit type, the determined coordinate, the generated timestamp, and, optionally, the identifier associated with the user. Edit mapping component can generate the mapping, as described above. At block 622, processing logic can update an edit data structure to include the generated mapping. In some embodiments, edit mapping component 224 can add the generated mapping to an entry 324 of data structure 260, in accordance with previously described embodiments.

Figure 7:
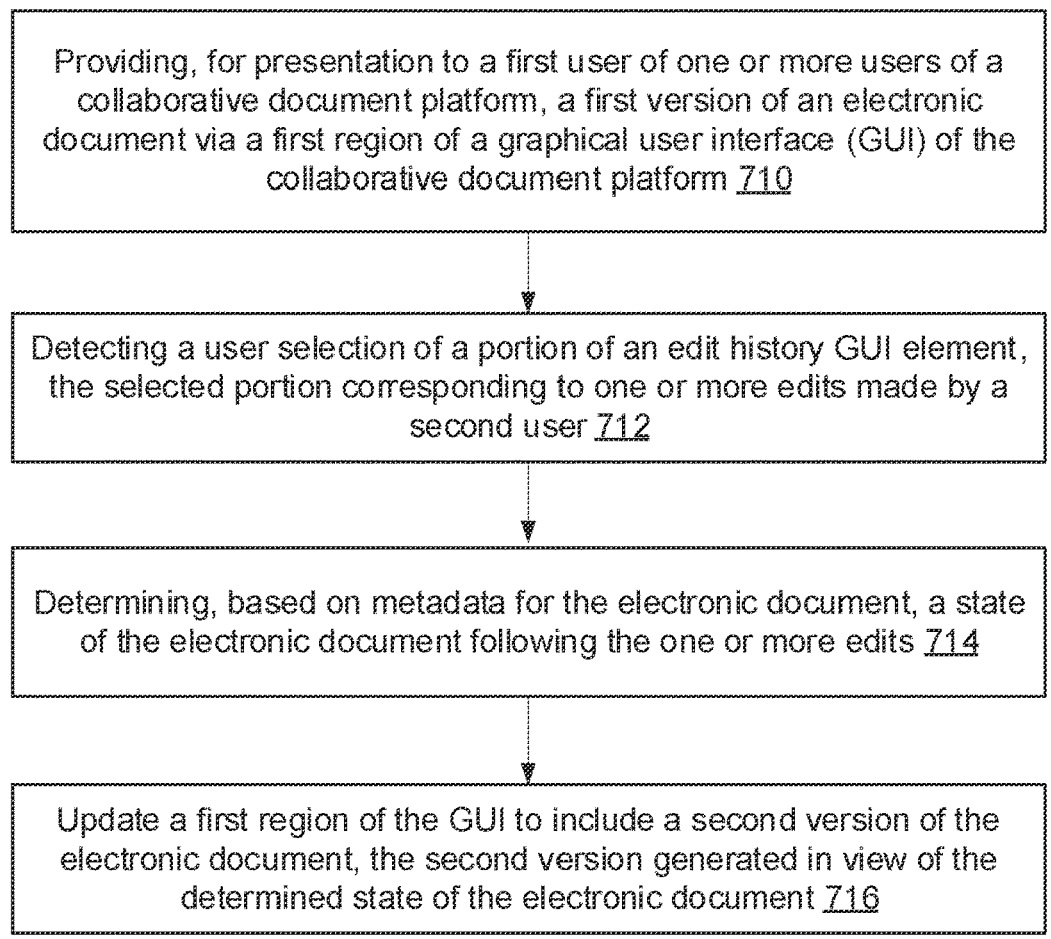
FIG. 7 depicts a flow diagram of an example method for providing one or more previous versions of an electronic document based on mappings included in an edit data structure, in accordance with implementations of the present disclosure.

FIG. 7 depicts a flow diagram of an example method 700 for providing one or more previous versions of an electronic document based on mappings included in an edit data structure, in accordance with implementations of the present disclosure. Method 700 can be performed by processing logic that can include hardware (circuitry, dedicated logic, etc.), software (e.g., instructions run on a processing device), or a combination thereof. In one implementation, some or all the operations of method 700 can be performed by one or more components of system 100 of FIG. 1. In some embodiments, some or all of the operations of method 700 can be performed by platform 120 and/or document version engine 151, as described above.

At block 710, processing logic can provide, for presentation to a first user of one or more users of a collaborative document platform, a first version of an electronic document via a first region of a graphical user interface (GUI) of the collaborative document platform. A second region of the GUI can include an edit history GUI element that enables a respective user of the one or more users to access each edit made to the electronic document by the one or more users. In some embodiments, the GUI of the collaborative document platform can correspond to GUI 410 and/or GUI 510, described with respect to FIGS. 4A-C and FIGS. 5A-C above.

At block 712, processing logic detects a user selection of a portion of an edit history GUI element, the selected portion corresponding to one or more edits made to the electronic document by a second user of the one or more users. The user can select the portion of the edit history GUI element (e.g., edit history GUI element 420, edit history GUI element 520, etc.) in accordance with previously described embodiments. GUI element detection component 270 can detect the user selection as described above.

At block 714, processing logic determines, based on metadata for the electronic document, a state of the electronic document following the one or more edits. In some embodiments, the metadata for the electronic document can include or otherwise correspond to pixel-to-time period mapping(s) 282 and/or data of edit data structure 260, as described above. Pixel-to-time period conversion component 272 and/or document state component 274 can determine the state of the electronic document, in accordance with previously described embodiments.

At block 716, processing logic updates a first region of the GUI to include a second version of the electronic document. The second version is generated in view of the determined state of the electronic document. As described above, document version generation component 276 can generate the second version of the electronic document based on the determined state. In some embodiments, document version generation component 276 can generate a rendering of the second version and provide the generated version for presentation via the first portion of the GUI, as described above.

Figure 8:
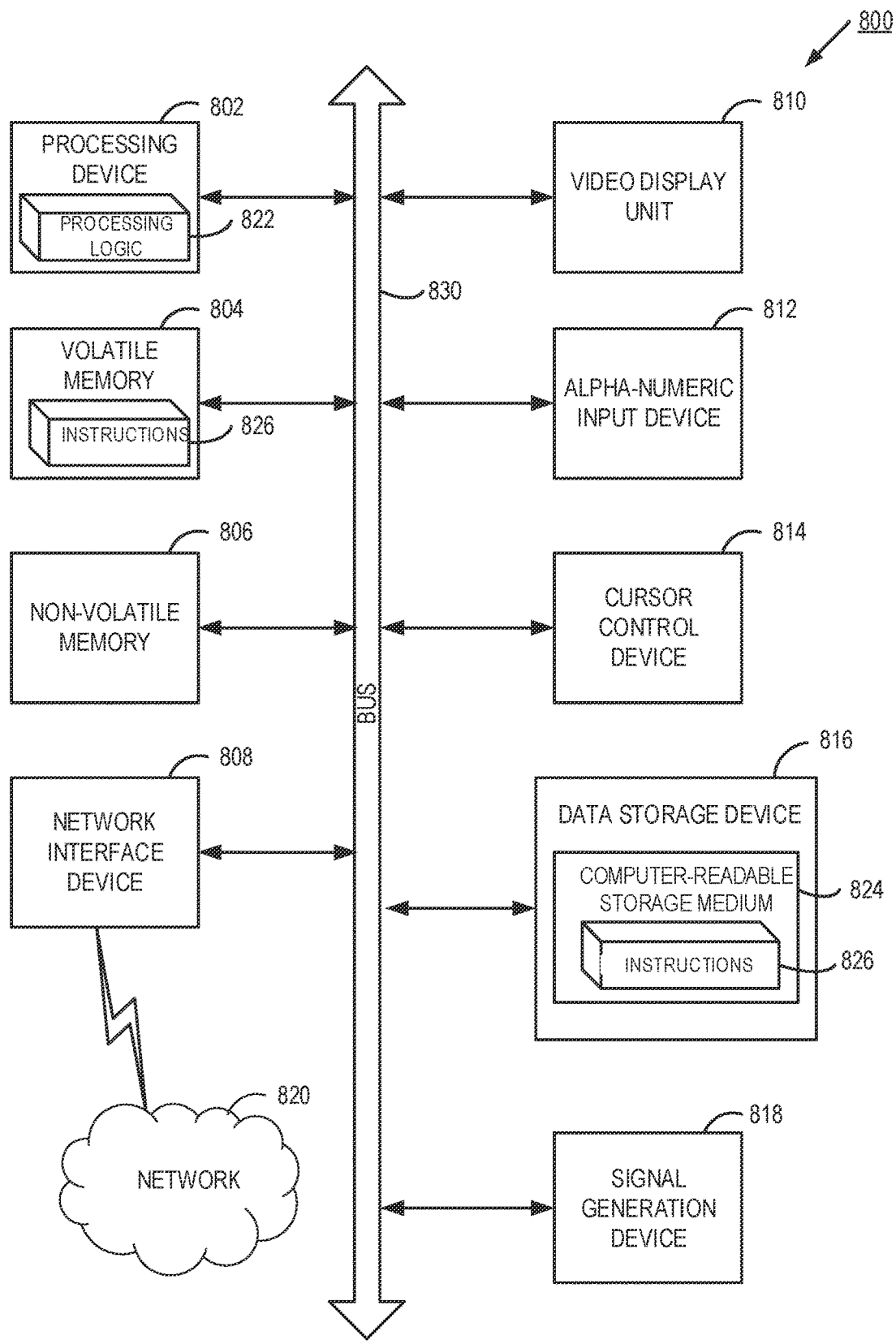
FIG. 8 is a block diagram illustrating an exemplary computer system, in accordance with implementations of the present disclosure.

FIG. 8 is a block diagram illustrating an exemplary computer system 1000, in accordance with implementations of the present disclosure. The computer system 800 can correspond to platform 120 and/or client devices 102A-N, described with respect to FIG. 1. Computer system 800 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 840.

Processor (processing device) 802 represents one or more general-purpose processing devices such as a microprocessor, central processing unit, or the like. More particularly, the processor 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 802 is configured to execute instructions 805 (e.g., for predicting channel lineup viewership) for performing the operations discussed herein.

The computer system 800 can further include a network interface device 808. The computer system 800 also can include a video display unit 810 (e.g., a liquid crystal display (LCD) or a cathode ray tube (CRT)), an input device 812 (e.g., a keyboard, and alphanumeric keyboard, a motion sensing input device, touch screen), a cursor control device 814 (e.g., a mouse), and a signal generation device 820 (e.g., a speaker).

The data storage device 818 can include a non-transitory machine-readable storage medium 824 (also computer-readable storage medium) on which is stored one or more sets of instructions 805 (e.g., for providing fine-grained version histories of electronic documents at a platform) embodying any one or more of the methodologies or functions described herein. The instructions can also reside, completely or at least partially, within the main memory 804 and/or within the processor 802 during execution thereof by the computer system 800, the main memory 804 and the processor 802 also constituting machine-readable storage media. The instructions can further be transmitted or received over a network 830 via the network interface device 808.

In one implementation, the instructions 805 include instructions for providing fine-grained version histories of electronic documents at a platform. While the computer-readable storage medium 824 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/ or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
providing, for presentation to one or more of a plurality of users of a collaborative electronic document platform, a first version of an electronic document via a first region of a graphical user interface (GUI) of the collaborative document platform and an edit history GUI element via, a second region of the GUI, wherein the edit history GUI element enables the one or more of the plurality of users to access each iteration of edits made to the electronic document between a first time period and a second time period, the edit history GUI element comprising:
a first visual representation of one or more first edits made to the electronic document between the first time period and the second time period, wherein the first visual representation indicates a first user of the plurality of users that provided the first edits and a first location of the electronic document that comprises a first content item subject to the one or more first edits, and
a second visual representation of one or more second edits made to the electronic document between the first time period and the second time period, wherein the second visual representation indicates a second user of the plurality of users that provided the second edits and a second location of the electronic document that comprises a second content item subject to the one or more second edits;
detecting a user selection of a portion of the edit history GUI element, wherein the user-selected portion of the edit history GUI element corresponds to a particular iteration of at least one of the one or more first edits or the one or more second edits;
determining, based on metadata for the electronic document, a state of the electronic document when the particular iteration of the at least one of the one or more first edits or the one or more second edits was completed; and updating the first region of the GUI to include a rendering of a second version of the electronic document, wherein the second version of the electronic document is rendered in view of the determined state of the electronic document.

2. The method of claim 1, wherein the metadata for the electronic document comprises an edit data structure, wherein each entry of the edit data structure comprises a mapping between a time period at which a particular edit was made to the electronic document, a type of the particular edit, and a coordinate associated with a section of the electronic document corresponding to the particular edit.

3. The method of claim 2, further comprising:
identifying a set of pixels of the GUI that correspond to the user-selected portion of the edit history GUI element;
determining, using a pixel-to-time period mapping, a time period associated with the identified set of pixels, wherein the determined time period corresponds to at least one of the first time period or the second time period;
identifying a respective timestamp of a set of timestamps generated for edits made to the electronic document that satisfies a time period criterion in view of the determined time period associated with the identified set of pixels;
identifying an entry of the edit data structure that corresponds to the respective timestamp; and
extracting the type of each of the at least one of the one or more first edits or the one or more second edits and a coordinate associated with at least one of the first location or the second location of the electronic document corresponding to a respective edit iteration of the at least one of the one or more first edits or the one or more second edits from the identified mapping, wherein the second version of the electronic document is generated based on the extracted type of the respective edit iteration and the coordinate associated with the at least one of the first location or the second location of the electronic document corresponding to the respective edit iteration.

4. The method of claim 1, further comprising:
responsive to detecting the one or more first edits made to the electronic document by the first user, generating, for each of the one or more first edits, a mapping between a time of the first time period at which a respective edit was made, a type of the respective edit, and a coordinate associated with a section of the electronic document corresponding to the respective edit; and
updating an entry of an edit data structure included in metadata for the electronic document to include the generated mapping.

5. The method of claim 1, further comprising:
detecting another user selection of an additional portion of the edit history GUI element, wherein the additional portion of the edit history GUI element corresponds to one or more additional edits made to the electronic document by at least one of the second user or a third user of the plurality of users;
determining, based on the metadata for the electronic document, an additional state of the electronic document following the one or more additional edits previously made to the electronic document by the at least one of the second user or the third user; and updating the first region of the GUI to include a third version of the electronic document, wherein the third version of the electronic document is generated in view of the determined additional state of the electronic document.

6. The method of claim 1, wherein at least one of the one or more first edits or the one or more second edits comprise at least one of an addition of at least one of the first content item or the second content item to the electronic document, a deletion of at least one of the first content item or the second content item from the electronic document, a modification of at least one of a format or a style of at least one of the first content item or the second content item in the electronic document, or a movement of at least one of the first content item or the second content item from a first section of the electronic document to a second section of the electronic document.

7. The method of claim 1, wherein at least one of the first content item or the second content item comprises at least one of one or more alphanumeric characters, one or more symbolic characters, one or more image objects, or one or more drawing objects.

8. The method of claim 1, wherein updating the first region of the GUI to include the rendering of the second version of the electronic document further comprises:
updating the first region of the GUI to include a first GUI element and a second GUI element, wherein the first GUI element indicates the first location comprising the first content item subject to the one or more first edits and the second GUI element indicates the second location comprising the second content item subject to the one or more second edits.

9. A system comprising:
a memory device; and
a processing device coupled to the memory device, the processing device to perform operations comprising:
providing, for presentation to one or more of a plurality of users of a collaborative electronic document platform, a first version of an electronic document via a first region of a graphical user interface (GUI) of the collaborative electronic document platform and an edit history GUI element via a second region of the GUI, wherein the edit history GUI element enables the one or more of the plurality of users to access each iteration of edits made to the electronic document between a first time period and a second time period, the edit history GUI element comprising:
a first visual representation of one or more first edits made to the electronic document between the first time period and the second time period, wherein the first visual representation indicates a first user of the plurality of users that provided the first edits and a first location of the electronic document that comprises a first content item subject to the one or more first edits, and
a second visual representation of one or more second edits made to the electronic document between the first time period and the second time period, wherein the second visual representation indicates a second user of the plurality of users that provided the second edits and a second location of the electronic document that comprises a second content item subject to the one or more second edits;
detecting a user selection of a portion of the edit history GUI element, wherein the user-selected portion of the edit history GUI element corresponds to a particular iteration of at least one of the one or more first edits or the one or more second edits;

determining, based on metadata for the electronic document, a state of the electronic document when the particular iteration of the at least one of the one or more first edits or the one or more second edits was completed; and updating the first region of the GUI to include a rendering of a second version of the electronic document, wherein the second version of the electronic document is rendered in view of the determined state of the electronic document.

10. The system of claim 9, wherein the metadata for the electronic document comprises an edit data structure, wherein each entry of the edit data structure comprises a mapping between a time period at which a particular edit was made to the electronic document, a type of the particular edit, and a coordinate associated with a section of the electronic document corresponding to the particular edit.

11. The system of claim 10, wherein the operations further comprise:
identifying a set of pixels of the GUI that correspond to the user-selected portion of the edit history GUI element;
determining, using a pixel-to-time period mapping, a time period associated with the identified set of pixels, wherein the determined time period corresponds to at least one of the first time period or the second time period;
identifying a respective timestamp of a set of timestamps generated for edits made to the electronic document that satisfies a time period criterion in view of the determined time period associated with the identified set of pixels;
identifying an entry of the edit data structure that corresponds to the respective timestamp; and
extracting the type of each of the at least one of the one or more first edits or the one or more second edits and a coordinate associated with at least one of the first location or the second location of the electronic document corresponding to a respective edit iteration of the at least one of the one or more first edits or the one or more second edits from the identified mapping, wherein the second version of the electronic document is generated based on the extracted type of the respective edit iteration and the coordinate associated with the at least one of the first location or the second location of the electronic document corresponding to the respective edit iteration.

12. The system of claim 9, wherein the operations further comprise:
responsive to detecting the one or more first edits made to the electronic document by the first user, generating, for each of the one or more first edits, a mapping between a time of the first time period at which a respective edit was made, a type of the respective edit, and a coordinate associated with a section of the electronic document corresponding to the respective edit; and
updating an entry of an edit data structure included in metadata for the electronic document to include the generated mapping.

13. The system of claim 9, wherein the operations further comprise:
detecting another user selection of an additional portion of the edit history GUI element, wherein the additional portion of the edit history GUI element corresponds to one or more additional edits made to the electronic document by at least one of the second user or a third user of the plurality of users;
determining, based on the metadata for the electronic document, an additional state of the electronic document following the one or more additional edits previously made to the electronic document by the at least one of the second user or the third user; and
updating the first region of the GUI to include a third version of the electronic document, wherein the third version of the electronic document is generated in view of the determined additional state of the electronic document.

14. The system of claim 9, wherein at least one of the one or more first edits or the one or more second edits comprise at least one of an addition of at least one of the first content item or the second content item to the electronic document, a deletion of at least one of the first content item or the second content item from the electronic document, a modification of at least one of a format or a style of at least one of the first content item or the second content item in the electronic document, or a movement of the content item from a first section of the electronic document to a second section of the electronic document.

15. The system of claim 9, wherein at least one of the first content item or the second content item comprises at least one of one or more alphanumeric characters, one or more symbolic characters, one or more image objects, or one or more drawing objects.

16. A non-transitory computer readable storage medium comprising instructions for a server that, when executed by a processing device, cause the processing device to perform operations comprising:
providing, for presentation to one or more of a plurality of users of a collaborative electronic document platform, a first version of an electronic document via a first region of a graphical user interface (GUI) of the collaborative document platform and an edit history GUI element via, a second region of the GUI, wherein the edit history GUI element enables the one or more of the plurality of users to access each iteration of edits made to the electronic document between a first time period and a second time period, the edit history GUI element comprising:
a first visual representation of one or more first edits made to the electronic document between the first time period and the second time period, wherein the first visual representation indicates a first user of the plurality of users that provided the first edits and a first location of the electronic document that comprises a first content item subject to the one or more first edits, and
a second visual representation of one or more second edits made to the electronic document between the first time period and the second time period, wherein the second visual representation indicates a second user of the plurality of users that provided the second edits and a second location of the electronic document that comprises a second content item subject to the one or more second edits;
detecting a user selection of a portion of the edit history GUI element, wherein the user-selected portion of the edit history GUI element corresponds to a particular iteration of at least one of the one or more first edits or the one or more second edits;
determining, based on metadata for the electronic document, a state of the electronic document when the particular iteration of the at least one of the one or more first edits or the one or more second edits was completed; and updating the first region of the GUI to include a rendering of a second version of the electronic document, wherein the second version of the electronic document is rendered in view of the determined state of the electronic document.

17. The non-transitory computer readable storage medium of claim 16, wherein the metadata for the electronic document comprises an edit data structure, wherein each entry of the edit data structure comprises a mapping between a time period at which a particular edit was made to the electronic document, a type of the particular edit, and a coordinate associated with a section of the electronic document corresponding to the particular edit.

18. The non-transitory computer readable storage medium of claim 17, wherein the operations further comprise:

identifying a set of pixels of the GUI that correspond to the user-selected portion of the edit history GUI element;

determining, using a pixel-to-time period mapping, a time period associated with the identified set of pixels, wherein the determined time period corresponds to at least one of the first time period or the second time period;

identifying a respective timestamp of a set of timestamps generated for edits made to the electronic document that satisfies a time period criterion in view of the determined time period associated with the identified set of pixels;

identifying an entry of the edit data structure that corresponds to the respective timestamp; and extracting the type of each of the at least one of the one or more first edits or the one or more second edits and a coordinate associated with at least one of the first location or the second location of the electronic document corresponding to a respective edit iteration of the at least one of the one or more first edits or the one or more second edits from the identified mapping, wherein the second version of the electronic document is generated based on the extracted type of the respective edit iteration and the coordinate associated with the at least one of the first location or the second location of the electronic document corresponding to the respective edit iteration.

19. The non-transitory computer readable storage medium of claim 16, wherein the operations further comprise:

responsive to detecting the one or more first edits made to the electronic document by the first user, generating, for each of the one or more first edits, a mapping between a time of the first time period at which a respective edit was made, a type of the respective edit, and a coordinate associated with a section of the electronic document corresponding to the respective edit; and updating an entry of an edit data structure included in metadata for the electronic document to include the generated mapping.

20. The non-transitory computer readable storage medium of claim 16, wherein the operations further comprise:

detecting another user selection of an additional portion of the edit history GUI element, wherein the additional portion of the edit history GUI element corresponds to one or more additional edits made to the electronic document by at least one of the second user or a third user of the plurality of users;

determining, based on the metadata for the electronic document, an additional state of the electronic document following the one or more additional edits previously made to the electronic document by the at least one of the second user or the third user; and updating the first region of the GUI to include a third version of the electronic document, wherein the third version of the electronic document is generated in view of the determined additional state of the electronic document.

* * * * *